US012410578B2

(12) United States Patent
Horii et al.

(10) Patent No.: US 12,410,578 B2
(45) Date of Patent: Sep. 9, 2025

(54) WORKING MACHINE

(71) Applicant: KUBOTA CORPORATION, Osaka (JP)

(72) Inventors: Hiroshi Horii, Sakai (JP); Hiroya Mori, Sakai (JP); Atsushi Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 759 days.

(21) Appl. No.: 17/325,826

(22) Filed: May 20, 2021

(65) Prior Publication Data

US 2021/0270003 A1 Sep. 2, 2021

Related U.S. Application Data

(63) Continuation of application No. PCT/JP2019/050491, filed on Dec. 24, 2019.

(30) Foreign Application Priority Data

Dec. 25, 2018 (JP) ................................ 2018-241470
Jun. 27, 2019 (JP) ................................ 2019-120305

(51) Int. Cl.
*E02F 3/32* (2006.01)
*E02F 9/20* (2006.01)
(Continued)

(52) U.S. Cl.
CPC ............ *E02F 3/325* (2013.01); *E02F 9/2271* (2013.01); *E02F 9/264* (2013.01); *F15B 15/16* (2013.01);
(Continued)

(58) Field of Classification Search
CPC . E02F 3/325; E02F 3/964; E02F 9/006; E02F 9/2004; E02F 9/2203; E02F 9/2271;
(Continued)

(56) References Cited

U.S. PATENT DOCUMENTS

2002/0062587 A1 5/2002 Kimoto et al.
2013/0345939 A1* 12/2013 Magaki ................ E02F 9/2075 701/50
(Continued)

FOREIGN PATENT DOCUMENTS

CN 101243259 A 8/2008
CN 104583178 A 4/2015
(Continued)

OTHER PUBLICATIONS

Extended European Search Report for European Application No. 19906478.3, dated Sep. 28, 2022.

*Primary Examiner* — Lisa M Caputo
*Assistant Examiner* — Joshua L Forristall
(74) *Attorney, Agent, or Firm* — Birch, Stewart, Kolasch & Birch, LLP

(57) ABSTRACT

A working machine, in which a detection device for detecting a swing position of a supported member is prevented from being damaged, includes a support member pivotally supporting the supported member via a pivot, and a cylinder telescopically moved by extension and contraction movement of its piston rod with respect to its cylinder tube by hydraulic fluid flowing through a fluid passage formed in the piston rod. The cylinder tube is pivotally supported by a first end portion of the support member, and the piston rod is pivotally supported by a second end portion of the support member. The detection device for detecting a telescopic movement state of the cylinder is provided between the cylinder and the support member.

16 Claims, 23 Drawing Sheets

(51) Int. Cl.
*E02F 9/22* (2006.01)
*E02F 9/26* (2006.01)
*F15B 15/16* (2006.01)

(52) U.S. Cl.
CPC ........... *E02F 9/2004* (2013.01); *E02F 9/2203* (2013.01); *E02F 9/2278* (2013.01)

(58) Field of Classification Search
CPC ......... E02F 9/2278; E02F 9/264; F15B 15/16; F15B 15/2807; F15B 15/2861; F15B 15/2892
USPC .......................................................... 702/150
See application file for complete search history.

(56) References Cited

U.S. PATENT DOCUMENTS

| | | | | |
|---|---|---|---|---|
| 2016/0138240 | A1* | 5/2016 | Ikegami | E02F 9/26<br>60/420 |
| 2017/0260717 | A1* | 9/2017 | Seki | E02F 3/32 |
| 2018/0178342 | A1* | 6/2018 | Russell | G01C 9/04 |
| 2019/0085875 | A1* | 3/2019 | Slama | G01D 5/12 |
| 2020/0040554 | A1* | 2/2020 | Nishimura | E02F 9/264 |
| 2020/0173148 | A1* | 6/2020 | Nishi | E02F 9/26 |
| 2021/0002853 | A1* | 1/2021 | Yamashita | E02F 9/2203 |
| 2021/0148082 | A1* | 5/2021 | Suzuki | E02F 9/265 |
| 2021/0230827 | A1* | 7/2021 | Bitter | E02F 3/435 |

FOREIGN PATENT DOCUMENTS

| | | | | | |
|---|---|---|---|---|---|
| DE | 20 2013 003 314 | U1 | | 8/2014 | |
| EP | 1942281 | A1 | | 7/2008 | |
| JP | 10-121523 | A | | 5/1998 | |
| JP | 2006-220179 | A | | 8/2006 | |
| JP | 2010-168775 | A | | 8/2010 | |
| JP | 2011-252338 | A | | 12/2011 | |
| JP | 2013133913 | A | * | 7/2013 | F15B 15/149 |
| JP | 2013-167099 | A | | 8/2013 | |
| JP | 2018-146726 | A | | 9/2018 | |
| WO | WO 2015/060730 | A1 | | 4/2015 | |

* cited by examiner

| | First Direction | Second Direction |
|---|---|---|
| OFF→ON | OFF-to-ON Shifts Count B1 | OFF-to-ON Shifts Count F1 |
| ON→OFF | ON-to-OFF Shifts Count B2 | ON-to-OFF Shifts Count F2 |
| ON Time | Time B3 | Time F3 |
| OFF Time | Time B4 | Time F4 |

WORKING MACHINE

CROSS REFERENCE TO RELATED APPLICATIONS

This application is a continuation application of International Application No. PCT/JP2019/050491, filed on Dec. 24, 2019, which claims the benefit of priority to Japanese Patent Application No. 2018/241470, filed on Dec. 25, 2018 and to Japanese Patent Application No. 2019/120305, filed on Jun. 27, 2019. The entire contents of each of these applications are hereby incorporated herein by reference.

BACKGROUND OF THE INVENTION

Field of the Invention

The present invention relates to a working machine such as a backhoe.

Description of the Related Art

The working machine disclosed in Japanese Unexamined Patent Publication No. 2011-252338 is known.

The working machine disclosed in Japanese Unexamined Patent Publication No. 2011-252338 includes a working device attached to a machine body thereof. The working device includes a boom swingably attached to the machine body, an arm swingably supported at a basal end portion thereof by the boom, and a working tool (e.g., a bucket) pivotally supported by a tip end portion of the arm via a pivot. A bucket cylinder (serving as a working tool cylinder) is pivotally supported by the arm via a cylinder shaft. The bucket is swung to a dump side and to a crowd side by telescoping the bucket cylinder.

The working machine includes a detection device for detecting the swing position of the working tool around the pivot. The detection device is provided on a pivotally supported portion of the working tool via the pivot.

SUMMARY OF THE INVENTION

In a first aspect of the present invention, a working machine comprises a support member, a supported member pivotally supported by an end portion of the support member via a pivot, and a cylinder of which telescopic movement causes the supported member to swing around the pivot. The cylinder includes a cylinder tube, and a piston rod inserted into the cylinder tube. The cylinder is constituted by a hydraulic cylinder telescopically moved by extension and contraction movement of the piston rod with respect to the cylinder tube by hydraulic fluid flowing through a fluid passage formed in the piston rod. The cylinder tube is pivotally supported by one of end portions of the support member, and the piston rod is pivotally supported by the other of the end portions of the support member. A detection device for detecting a telescopic movement state of the cylinder is provided between the cylinder and the support member.

The working machine comprises a machine body, and a boom swingably attached to the machine body. The support member is an arm pivotally supported at a basal end portion thereof by the boom. The supported member is a working tool pivotally supported by a tip end portion of the arm via the pivot. The cylinder is a working tool cylinder for swinging the working tool around the pivot.

The detection device includes a detected object provided on one of the cylinder tube and the piston rod, and a detector provided on the other of the cylinder tube and the piston rod. The detector detects the detected object for detection of the telescopic movement state of the cylinder.

The detected object is attached onto an outer surface of the cylinder tube facing the support member. The detected object has a predetermined length in the longitudinal direction of the cylinder tube, and includes a magnet. The detector is constituted by a proximity sensor, which is attached to the piston rod between the cylinder tube and the support member so as to be able to face the detected object, and which is configured to move together with the piston rod to detect the magnet.

The working machine comprises a detector mount to which the detector is attached; and a connection mechanism connecting the detector mount to the piston rod. The piston rod includes a first connection piece joined to the piston rod, a second connection piece joined to the detection attachment member, and a connection pin passed through the first connection piece and the second connection piece so as to connect the first connection piece and the second connection piece to each other. A pin hole is formed in the connection piece to allow the connection pin to pass therethrough. The pin hole is formed into a long hole shape to allow axial rotation of the piston rod.

The working machine comprises an arm serving as the support member, a working tool serving as the supported member pivotally and swingably supported by a tip end portion of the arm, a working tool cylinder serving as the cylinder pivotally supported by the arm via a cylinder shaft, the telescopic movement of the working tool cylinder causing the working tool to swing, an angle sensor which detects a swing angle of the working tool cylinder when the working tool is disposed on a dump side with respect to a neutral position where a swing angle of the working tool cylinder around the cylinder shaft becomes maximum, and which detects a swing angle of the working tool cylinder when the working tool is disposed on a crowd side with respect to the neutral position, and a controller for determining the swing position of the working tool based on the swing angle detected by the means of angle sensor and a result of detection by means of the detection device. The detection device detects ON and OFF signals indicating whether the working tool cylinder is extended further from the neutral position or is contracted further from the neutral position. The controller determines whether the working tool is on the dump side or the crowd side in accordance with a first detection pattern appearing in detection of the ON and OFF signals by means of the detection device when the working tool is moved in a first direction from the dump side to the crowd side, and a second detection pattern appearing in detection of the ON and OFF signals by means of the detection device when the working tool is moved in a second direction from the crowd side to the dump side.

In a second aspect of the invention, a working machine comprises an arm, a working tool pivotally and swingably supported by a tip end portion of the arm; a working tool cylinder pivotally supported by the arm via a cylinder shaft, the telescopic movement of the working tool cylinder causing the working tool to swing, an angle sensor which detects a swing angle of the working tool cylinder when the working tool is disposed on a dump side with respect to a neutral position where a swing angle of the working tool cylinder around the cylinder shaft becomes maximum, and which detects a swing angle of the working tool when the working tool is disposed on a crowd side with respect to the neutral position, a detection device which detects ON and OFF signals indicating whether the working tool cylinder is extended further from the neutral position or is contracted further from the neutral position, and a controller for determining the swing position of the working tool based on the swing angle detected by means of the angle sensor and a result of detection by means of the detection device. The controller determines whether the working tool is on the dump side or the crowd side in accordance with a first detection pattern appearing in detection of the ON and OFF signals by means of the detection device when the working tool is moved in a first direction from the dump side to the crowd side, and a second detection pattern appearing in detection of the ON and OFF signals by means of the detection device when the working tool is moved in a second direction from the crowd side to the dump side.

Based on the first detection pattern and the second detection pattern, the controller determines whether the working tool, when in a predetermined range as the vicinity of the neutral position, is on the dump side or the crowd side.

While the working tool is disposed out of the predetermined range, the controller keeps a result of the determination regarding the position of the working tool when in the predetermined range.

The working tool cylinder includes a cylinder tube, and a piston rod extended and contracted with respect to the cylinder tube. The detection device includes a detected object provided on one of the cylinder tube and the piston rod, and a detector provided on the other of the cylinder tube and the piston rod. The detector outputs the on or off signal in response to whether the detected object is detected or not.

Either a range ranging from the neutral position to an intermediate position between the neutral position and an end position on the dump side or a range ranging from the neutral position to an intermediate position between the neutral position and an end position on the crowd side is defined as a detectable range where the detected object is detectable by means of the detector.

Each of the first detection pattern and the second detection pattern is a combination of ON-to-OFF and OFF-to-ON signal shifts. The combination as the first detection pattern and the combination as the second detection pattern are different from each other.

When operation of the working tool is ended, the controller stores the result of determination of whether the working tool is on the dump side or the crowd side. The controller defines the position of the working tool stored on the ending of operation of the working tool as an initial position for restarting of operation of the working tool, and performs the determination when the working tool cylinder is extended or contracted from the initial position.

The working machine comprises a display unit connected to the controller. The display unit displays a message for urging an operator to operate to locate the working tool on either the dump side or the crowd side.

The controller performs the determination based on a detection value outputted from the angle sensor when an ON/OFF signal shift occurs in detection by means of the detection device.

When operation of the working tool is ended, the controller stores information indicating whether the working tool is on the dump side or the crowd side. When operation of the working tool is restarted, the controller determines the swing position of the working tool based on the information stored on the last ending of operation of the working tool.

The working machine comprises an instruction input unit for receiving an instruction input from an operator, the instruction input indicating whether the working tool is on the dump side or the crowd side.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
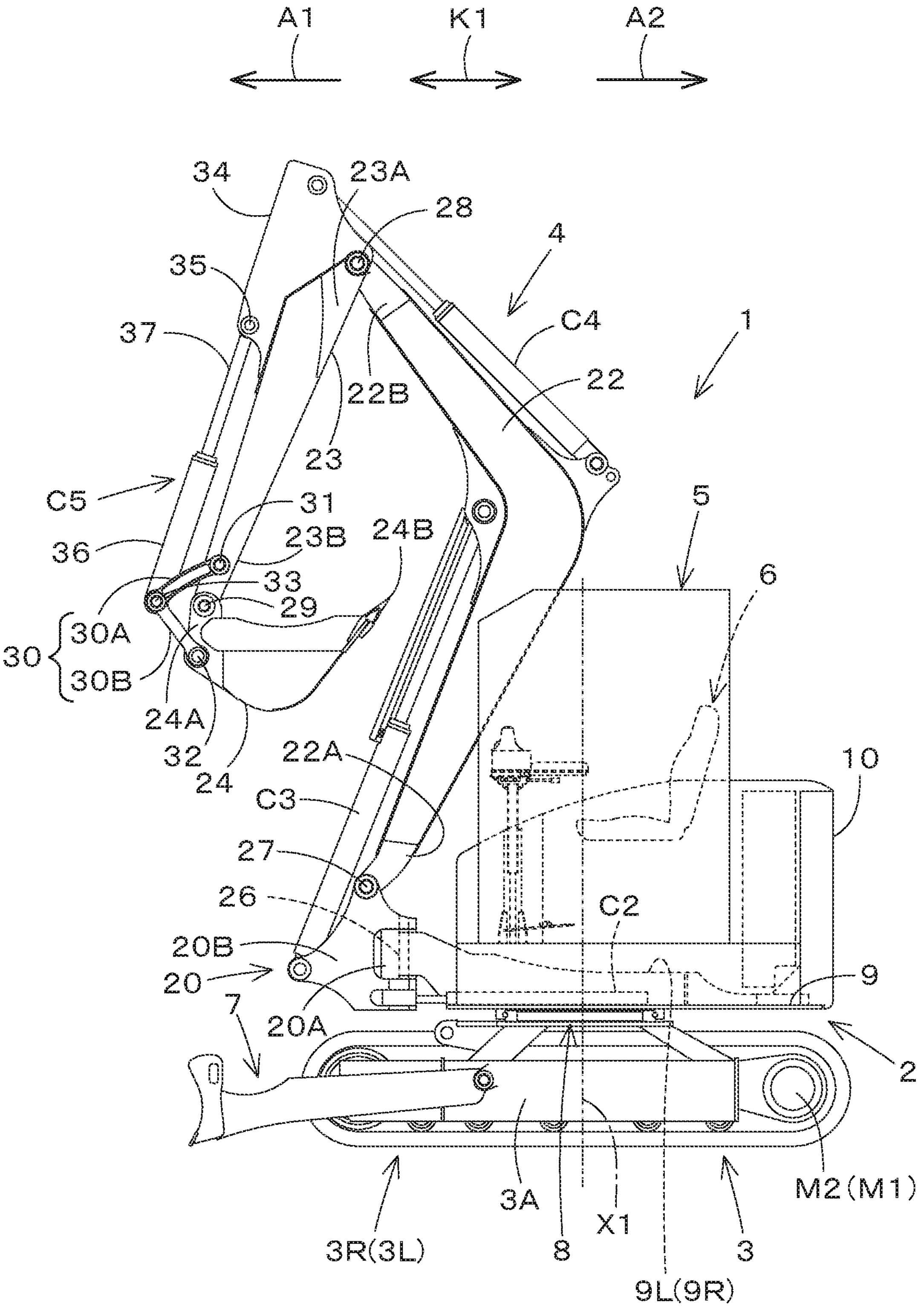
FIG. 1 is a side view of a working machine.

Preferred embodiments will now be described with reference to the accompanying drawings, wherein like reference numerals designate corresponding or identical elements throughout the various drawings. The drawings are to be viewed in an orientation in which the reference numerals are viewed correctly.

An embodiment of the present invention will be described with reference to the drawings.

FIG. 1 is a schematic overall side view of a working machine 1 according to the present embodiment. In this embodiment, the working machine 1 is exemplified by a backhoe serving as a kind of swivel working machine.

Referring to FIG. 1, the working machine 1 includes a machine body (or a swivel base) 2, a traveling device 3 and a working device 4. A cabin 5 is mounted on the machine body 2. An operator seat (or a seat) 6 on which a driver (or an operator) sits is provided in the cabin 5.

In the present embodiment, description will be given on the assumption that a forward direction corresponds to the forward direction (a direction designated by an arrow A1 in FIG. 1) from an operator sitting on the operator seat 6 in the working machine 1, a rearward direction corresponds to the rearward direction (a direction designated by an arrow A2 in FIG. 1) from the operator, a leftward direction corresponds to the leftward direction from the operator, and a rightward direction corresponds to the rightward direction from the operator. A fore-and-aft direction K1 is illustrated as the machine fore-and-aft direction, and a horizontal direction perpendicular to the fore-and-aft direction K1 is defined as a machine-width direction or a width direction of the machine body 2.

A machine-width distal direction or a distal direction in the machine-width direction corresponds to rightward or leftward direction from the central portion of the machine body 2. In other words, the machine-width distal direction is defined as the machine-width direction separating from the central portion of the machine body 2. A machine-width proximal direction or a proximal direction in the machine-width direction corresponds to the direction opposite to the machine-width distal direction. In other words, the machine-width proximal direction is defined as the machine-width direction approaching the central portion of the machine body 2.

Referring to FIG. 1, the traveling device 3 supports the machine body 2 travelably. The traveling device 3 includes a traveling frame 3A, a first traveling unit 3L provided on the left side of the traveling frame 3A, and a second traveling unit 3R provided on the right side of the traveling frame 3A. The first and second traveling units 3L and 3R are crawler traveling units. The first traveling unit 3L is driven by a first traveling motor M1. The second traveling unit 3R is driven by a second traveling motor M2. The first and second traveling motors M1 and M2 are hydraulic motors (or hydraulic actuators), for example.

A dozer 7 is attached to a front portion of the traveling device 3. The dozer 7 can be raised and lowered, i.e., a blade thereof can be moved upward and downward, by telescoping a dozer cylinder (or a hydraulic actuator).

Referring to FIG. 1, the machine body 2 is supported on the traveling frame 3A via a swivel bearing 8 so as to be swivelable around a swivel axis X1 that is a vertical center axis of the swivel bearing 8. A prime mover is mounted on the machine body 2. The prime mover is a diesel engine. Alternatively, it may be a gasoline engine, an LPG engine, or an electric motor. Alternatively, it may be a hybrid system including an engine and an electric motor.

Referring to FIG. 1, the machine body 2 includes a platform (hereinafter referred to as a swivel platform) 9 that is swivelable around the swivel axis X1. The swivel platform 9 is formed of a steel plate or so on such as to define a bottom of the machine body 2. The swivel platform 9 is provided on an upper face thereof close to the central portion thereof with longitudinal ribs 9L and 9R serving as reinforcement members extended between front and rear ends thereof. The machine body 2 is provided at a rear portion thereof with a weight 10 erected on the swivel platform 9.

The machine body 2 is provided on a front portion thereof with a support unit 20 for supporting the working device 4. The support unit 20 includes a support bracket 20A and a swing bracket 20B. The support bracket 20A is fixed to front portions of the longitudinal ribs 9L and 9R and protrudes forward from the machine body 2. The swing bracket 20B is attached to a front portion of the support bracket 20A, which is the portion protruding from the machine body 2, via a swing shaft 26 so as to be swingable around a vertical axis. Accordingly, the swing bracket 20B is rotatable in the machine-width direction, i.e., horizontally around the swing shaft 26.

Figure 2:
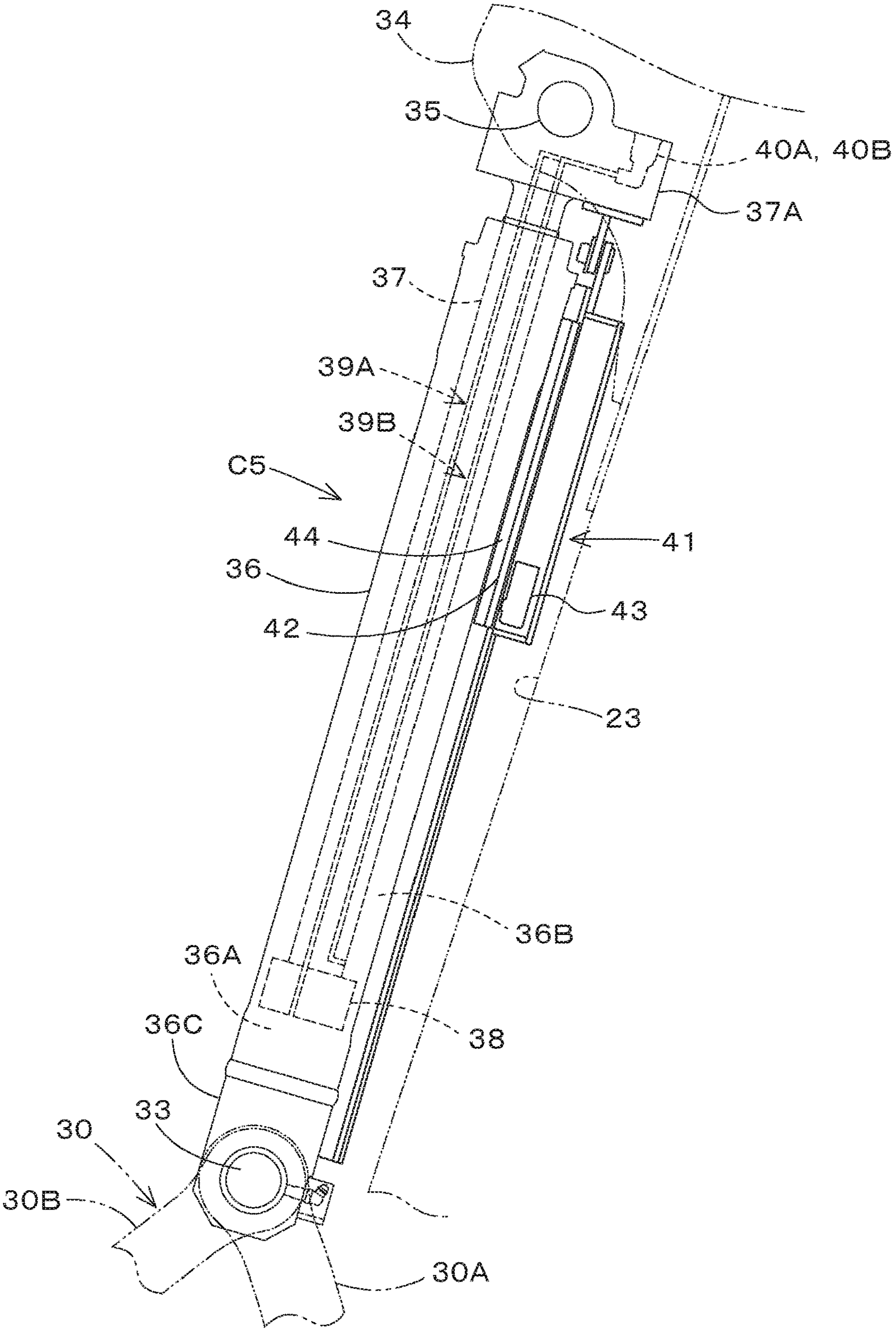
FIG. 2 is a side view of a working tool cylinder.

Referring to FIG. 1, the working device 4 is attached to the swing bracket 20B. The working device 4 includes a boom 22, an arm (serving as a support member) 23 and a working tool (serving as a supported member) 24. A base portion 22A of the boom 22 is pivotally supported by an upper portion of the swing bracket 20B via a boom shaft 27. The boom shaft 27 has a horizontal axis perpendicular to the vertical direction. Accordingly, the boom 22, when directed forward of the machine body 2, is rotatable around a lateral axis, i.e., an axis extended in the machine-width direction. The boom 22 swings upward or downward when it rotates around the boom shaft 27. The boom 22 is bent so as to be rearwardly convex at the longitudinally central portion thereof when it is raised at a highest position such as shown in FIG. 2.

A basal end portion (a second end portion other than a later-discussed first end portion) 23A of the arm 23 is pivotally supported by a tip end portion 22B of the boom 22B via an arm shaft 28. The arm shaft 28 has an axis parallel to the axis of the boom shaft 27. Accordingly, the arm 23 is rotatable around a lateral axis when the boom 22 is directed forward of the machine body 2. The arm 23 swings in a crowd direction defined as a direction approaching the boom 22 or in a dump direction defined as a direction away from the boom 22 when it rotates around the arm shaft 28.

In the present embodiment, the working tool 24 is exemplified by a bucket serving as a standard attachment attached to the working device 4. Hereinafter, the working tool 24 may be referred to as the bucket.

A base portion 24A of the working tool 24 is pivotally supported by a tip end portion (a first end portion) 23B of the arm 23 via a working tool shaft (serving as a pivot) 29. The working tool shaft 29 may be referred to as a bucket shaft. The working tool shaft 29 has an axis parallel to the axis of the arm shaft 28. Accordingly, the working tool 24 is rotatable around a lateral axis when the boom 22 is directed forward of the machine body 2. A tip end portion 24B of the working tool 24 swings in a crowd direction, i.e., a direction approaching the arm 23, or in a dump direction, i.e., a direction away from the arm 23, when it rotates around the arm shaft 28. In other words, the bucket 24 is movable for scooping and dumping. The scooping movement means the swing of the bucket 24 in the direction approaching the boom 22, i.e., the crowd direction, when scooping up earth or so on, for example. The dumping movement means the swing of the bucket 24 in the direction away from the boom 22, i.e., the dump direction, when dumping or discharging the scooped earth or so on, for example.

The working tool 24 is connected to the arm 23 via a linkage 30. The linkage 30 includes a first link 30A and a second link 30B. The first link 30A is pivotally supported at a first end thereof by the arm 23 via a first link shaft 31. The second link 30B is pivotally supported at a first end thereof by the base portion 24A of the working tool 24 via a second link shaft 32. The first link 30A and the second link 30B are pivotally connected at second ends thereof to each other via a connection shaft 33. The first link shaft 31, the second link shaft 32 and the connection shaft 33 have respective axes parallel to the axis of the working tool shaft 29.

Another working tool driven by a hydraulic actuator, i.e., a hydraulic attachment, may be attached to the working machine 1 instead of or in addition to the bucket 24. Such another working tool is exemplified by a hydraulic breaker, a hydraulic crusher, an angle broom, an earth auger, a pallet fork, a sweeper, a mower, a snowblower or so on.

The swing bracket 20B is swingable by telescoping a swing cylinder C2 in the machine body 2. The boom 22 is swingable by telescoping a boom cylinder C3. The arm 23 is swingable by telescoping an arm cylinder C4. The working tool 24 is swingable by telescoping a working tool cylinder (a bucket cylinder) C5. The swing cylinder C2, the boom cylinder C3, the arm cylinder C4 and the working tool cylinder C5 are each constituted by a double acting hydraulic cylinder (hydraulic actuator).

Referring to FIG. 1, the working tool cylinder C5 is disposed forward from the arm 23. The working tool cylinder C5 is disposed along the arm 23 and is pivotally supported at a first end portion thereof by the basal end portion 23A of the arm 23. Specifically, the first end portion of the working tool cylinder C5 is pivotally supported via a cylinder shaft 35 by a cylinder bracket 34 fixed to the basal end portion 23A of the arm 23. The cylinder shaft 35 has an axis parallel to the axis of the arm shaft 28. The working tool cylinder C5 is pivotally supported at a second end portion thereof by the tip end portion 23B of the arm 23. Specifically, the second end portion of the working tool cylinder C5 is pivotally connected to the second end portions of the first and second links 30A and 30B via the connection shaft 33.

Referring to FIG. 2, the working tool cylinder C5 includes a cylinder tube 36 and a piston rod 37 which is extendable and contractible with respect to the cylinder tube 36, thereby being telescopically movable. Specifically, the working tool cylinder C5 includes a piston 38 axially movably incorporated in the cylinder tube 36. The piston rod 37 is joined to the piston 38 so that, when the piston 38 moves, the piston rod 37 axially moves together with the piston 38 so as to cause the extension or contraction movement of the working tool cylinder C5.

Referring to FIG. 2, the piston 38 divides the interior of the cylinder tube 36 into a first pressure chamber 36A on the bottom side and a second pressure chamber 36B on the rod side. The bottom side of the cylinder tube 36 is defined as the side through which the piston rod 37 is not passed. The rod side of the cylinder tube 36 is defined as the side opposite to the bottom side, i.e., the side through which the piston rod 37 is passed.

The piston rod 37 is provided with a rod head 37A at a tip end portion thereof opposite to the portion thereof joined to the piston 38. The rod head 37A is pivotally supported by the cylinder bracket 34 via the cylinder shaft 35. The cylinder tube 36 is provided with an attachment portion 36C at the bottom side end portion thereof. The attachment portion 36C is pivotally connected to the second end portions of the first and second links 30A and 30B via the connection shaft 33.

Figure 3:
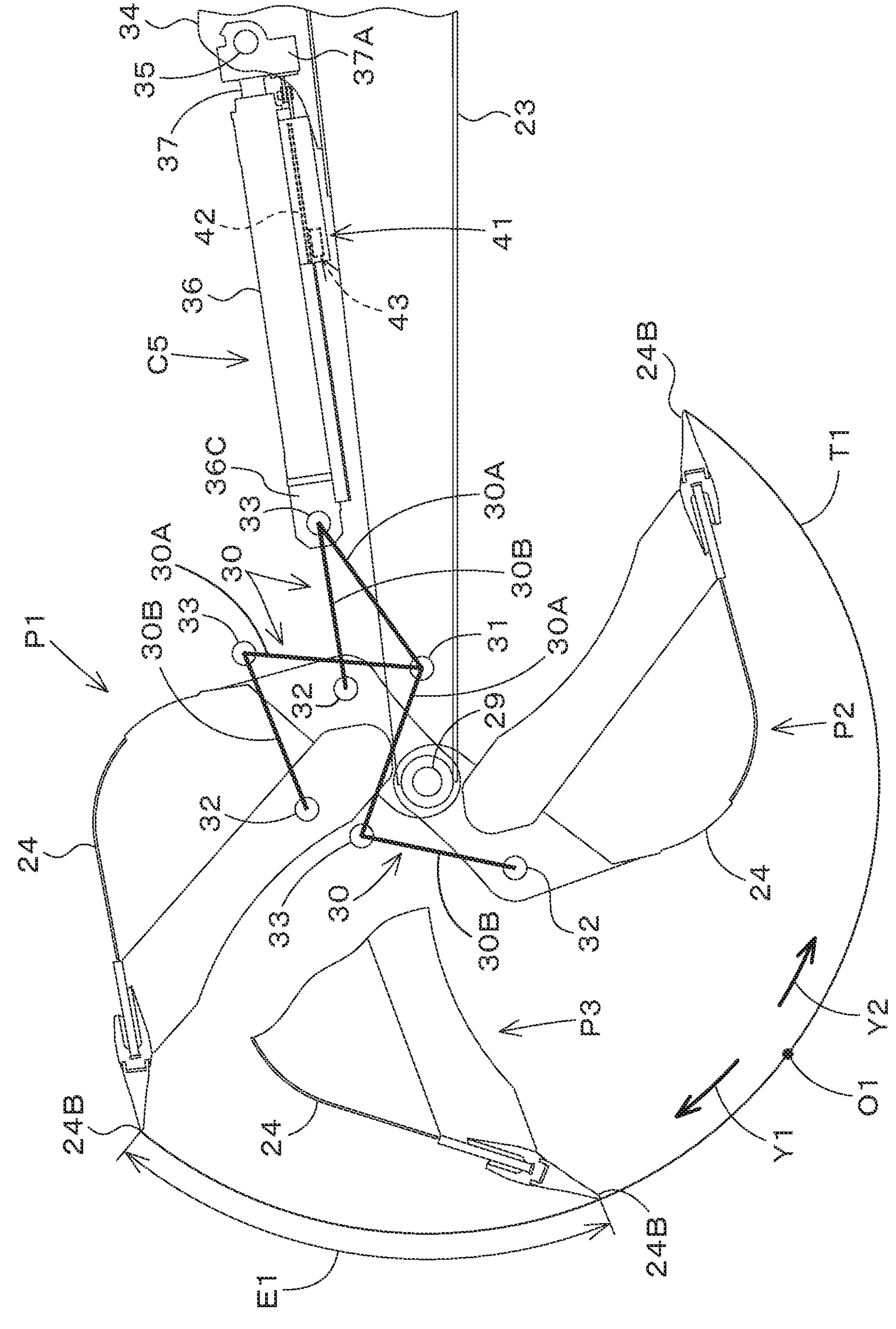
FIG. 3 is a side view of a working tool in operation.

Referring to FIG. 3, when the working tool cylinder C5 is telescoped, the working tool 24 swings in a dump direction Y1 or a crowd direction Y2 around the working tool shaft (bucket shaft) 29. The working tool 24 swings around the working tool shaft 29 so that the tip end portion 24B swings between a dump position (i.e., an end position on the dump side) P1 and a crowd position (i.e., an end position on the crowd side) P2. The dump position P1 is defined as the position of the working tool cylinder C5 when it is fully contracted (when in the fully contracted state). The crowd position P2 is defined as the position of the working tool cylinder C5 when it is fully extended (when in the fully extended state).

Figure 4:
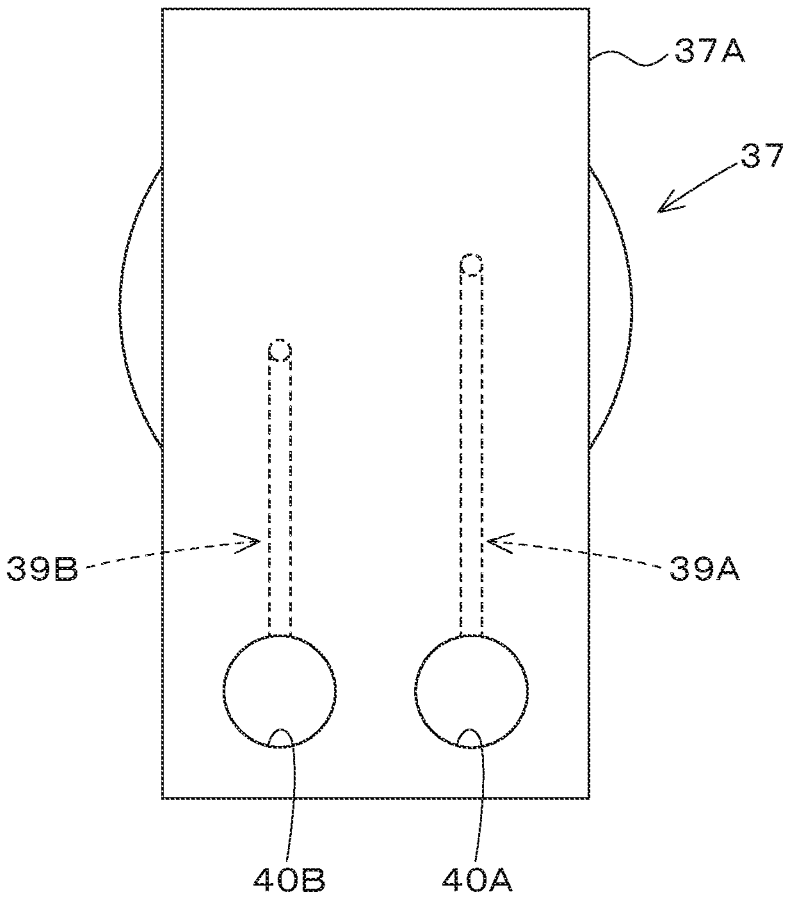
FIG. 4 is a view of a rod head of a piston rod when viewed axially.

Referring to FIG. 2, the working tool cylinder C5 is constituted by a hydraulic cylinder telescopically moved by hydraulic fluid flowing through fluid passages, including a first fluid passage 39A and a second fluid passage 39B, formed in the piston rod 37. In other words, the working tool cylinder C5 is constituted by a pipeless hydraulic cylinder having no hydraulic fluid pipe on the outside of the cylinder tube 36. The first fluid passage 39A is fluidly connected to the first pressure chamber 36A, and the second fluid passage 39B is fluidly connected to the second pressure chamber 36B. The rod head 37A is formed therein with a first port 40A joined to the first fluid passage 39A, and with a second port 40B joined to the second fluid passage 39B (see FIG. 4). Hydraulic fluid hoses are coupled to the first port 40A and the second port 40B, respectively, so that hydraulic fluid is supplied or discharged to and from each of the first and second ports 40A and 40B via each of the hydraulic fluid hoses. The fluid supply to the first port 40A causes the extension movement of the working tool cylinder C5. The fluid supply to the second port 40B causes the contraction movement of the working tool cylinder C5.

Referring to FIGS. 2 and 3, the working tool cylinder C5 and the arm 23 are provided therebetween with a detection device (or a position sensor) 41 for detecting a swing position of the working tool 24. The swing position is defined as a position of the working tool 24 swinging around the working tool shaft 29. This position may correspond to the dump position P1, the crowd position P2, or any position between the dumping position P1 and the crowd position P2. Due to the pipeless hydraulic cylinder employed as the working tool cylinder C5, the working tool cylinder C5 and the arm 23 have a space without a pipe or a hose therebetween. This space is useful for arrangement of the detection device 41. Due to the arrangement of the detection device 41 between the working tool cylinder C5 and the arm 23, the detection device 41 is prevented from being damaged.

The detection device 41 detects a telescopic movement state (or a stroke length) of the working tool cylinder C5, thereby detecting the swing position of the working tool 24. Specifically, referring to FIGS. 2 and 3, the detection device 41 includes a detected object 42 provided on the cylinder tube 36 and a detector 43 provided on the piston rod 37. The detector 43, while moving together with the piston rod 37, detects the detected object 42, thereby detecting the telescopic movement state of the working tool cylinder C5. Alternatively, the detected object 42 may be provided on the piston rod 37 and the detector 43 may be provided on the cylinder tube 36.

Referring to FIG. 2, the detected object 42 is attached to an outer surface of the cylinder tube 36 facing the arm 23. Specifically, the detected object 42 is fastened with screws or so on to an attachment plate 44 fixed to the cylinder tube 36. The attachment plate 44 is disposed on the rod-side portion of the cylinder tube 36 and is fixed to the outer surface of the cylinder tube 36 facing the arm 23 by welding or so on.

Figure 5:
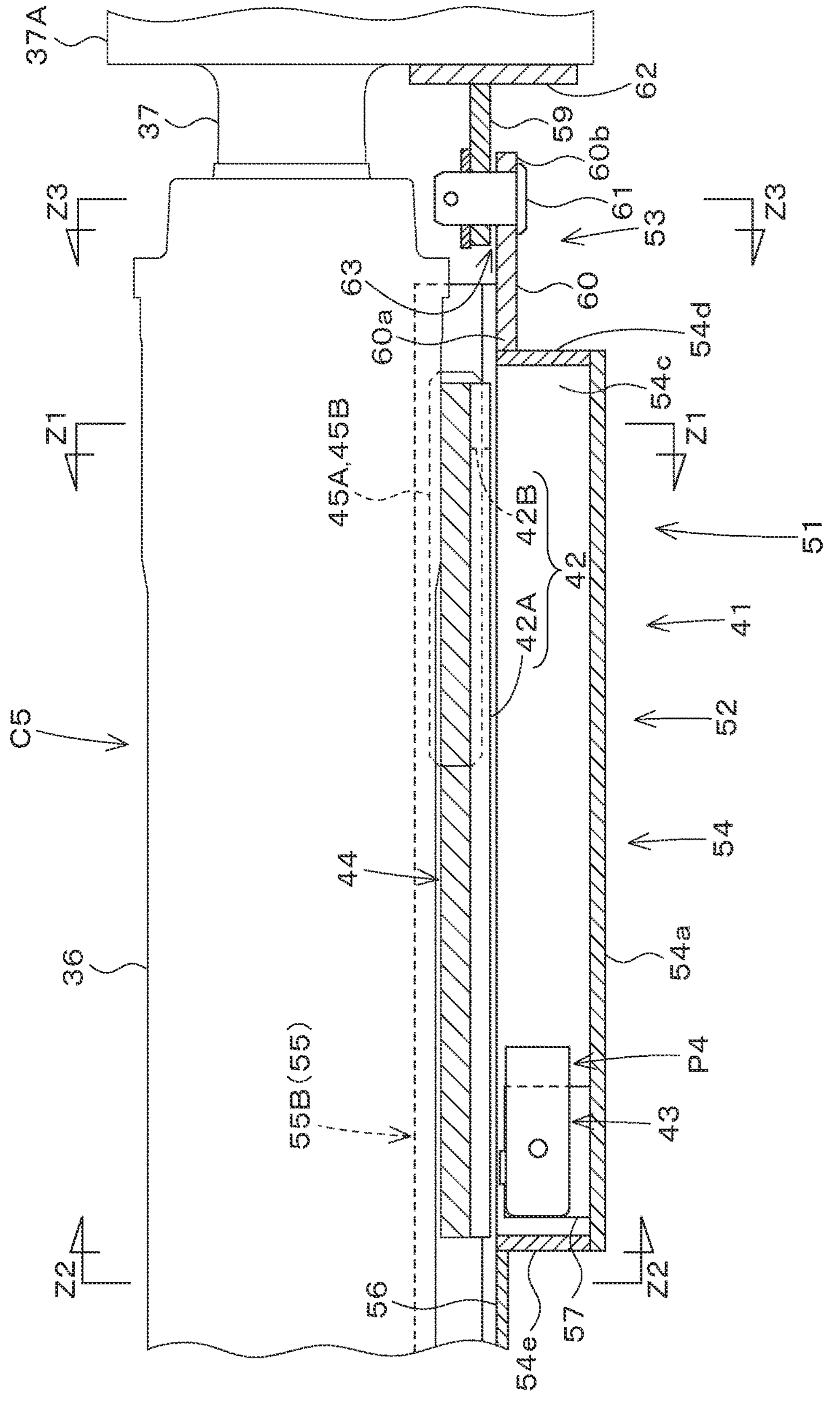
FIG. 5 is a sectional side view of a detection device.
Figure 6:
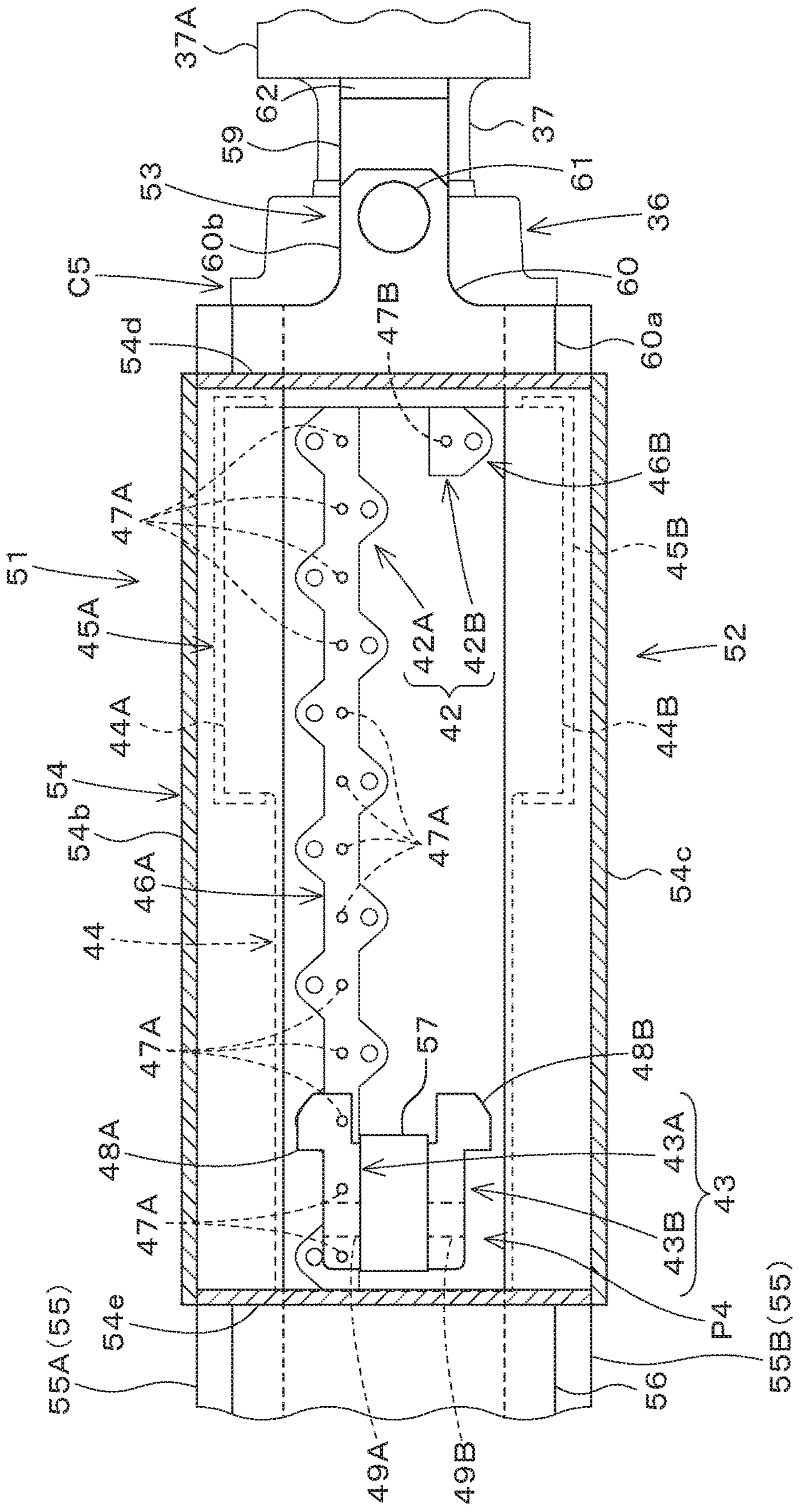
FIG. 6 is a view of the detection device when viewed from an arm side.
Figure 7:
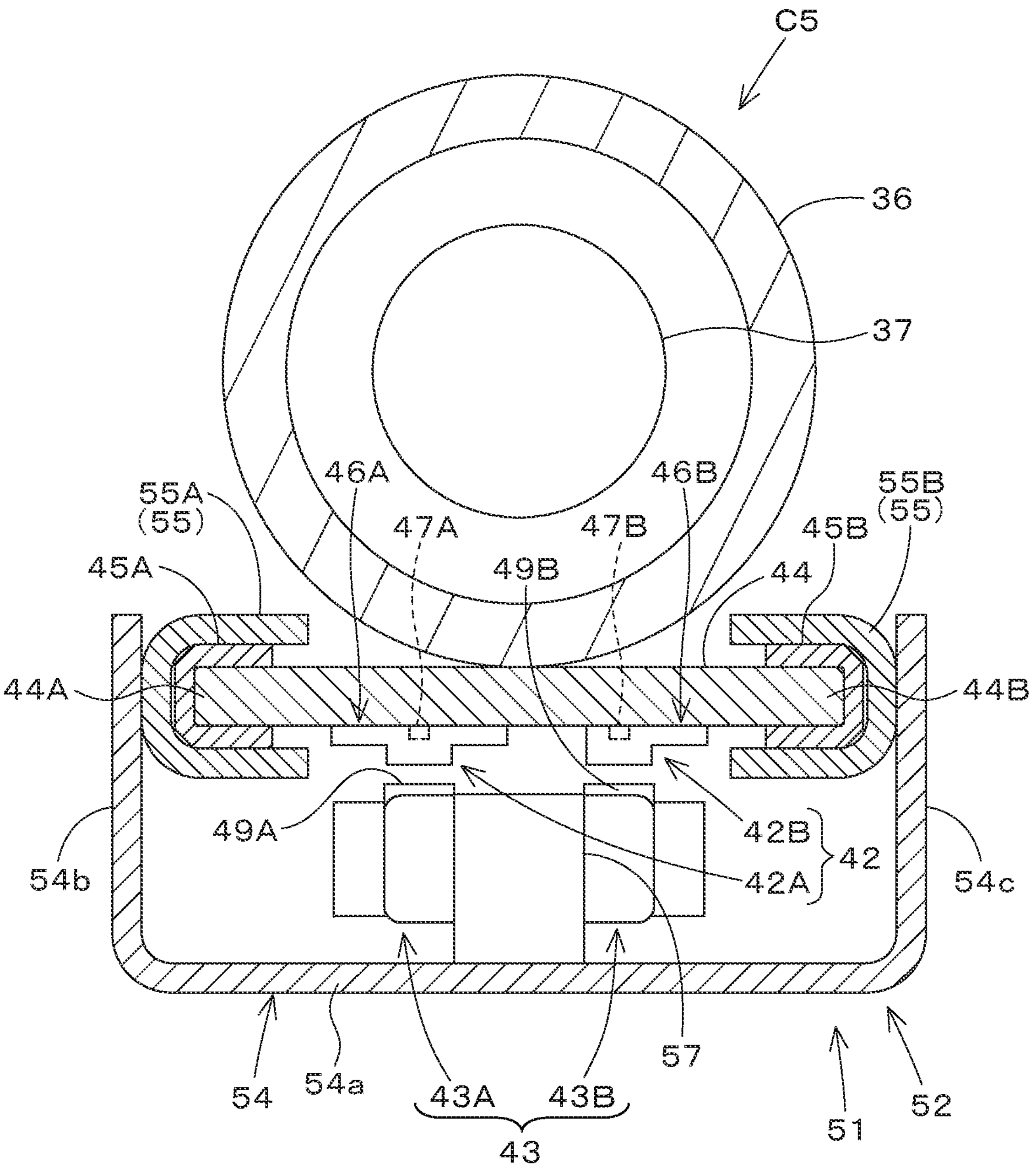
FIG. 7 is a cross sectional view taken along Z1-Z1 line of FIG. 5.

Referring to FIGS. 5 to 7, guide members including a first guide member 45A and a second guide member 45B are provided on the attachment plate 44. The attachment plate 44 has a first fitting portion 44A which protrudes leftward and is fittingly covered with the first guide member 45A. The attachment plate 44 has a second fitting portion 44B which protrudes rightward and is fittingly covered with the second guide member 45B. The first fitting portion 44A and the second fitting portion 44B are disposed close to a first end of the attachment plate 44 (i.e., an end of the attachment plate 44 on the rod-side of the cylinder tube 36).

Referring to FIGS. 6 and 7, the detected object 42 includes a first detected object 42A and a second detected object 42B. The first detected object 42A is disposed on a left portion of the attachment plate 44, and the second detected object 42B is disposed on a right portion of the attachment plate 44. The first detected object 42A has a predetermined length in the longitudinal direction of the cylinder tube 36 such as to have a first end corresponding to the first end of the attachment plate 44 and a second end corresponding to a second end of the attachment plate 44 (i.e., another end of the attachment plate 44 on the bottom-side of the cylinder tube 36). The first detected object 42A includes a casing 46A and a plurality of magnets 47A. The casing 46A is formed to have the length corresponding to the whole length of the attachment plate 44 between the first and second ends of the attachment plate 44, and is fastened to the attachment plate 44 by screws or so on. The casing 46A may be made of a single member extending from a first end thereof to a second end thereof, or may be dividable into parts in the longitudinal direction thereof.

The magnets 47A are provided inside of the casing 46A so that they are aligned at intervals from the first end of the casing 46A to the second end of the casing 46A. The magnets 47A may be replaced with a continuously formed magnet. The second detected object 42B is provided on a portion of the attachment plate 44 close to the first end of the attachment plate 44. The second detected object 42B includes a casing 46B and a single magnet 47B. The second detected object 42B may be omitted. To enhance the reliability of detection device 41, the second detected object 42B may be formed to have the same length as that of the first detected object 42A, and may be disposed to positionally coincide to the first detected object 42A in the longitudinal direction of the cylinder tube 36.

Referring to FIGS. 6 and 7, the detector 43 includes a first sensor 43A and a second sensor 43B. The first sensor 43A and the second sensor 43B function as proximity sensors and as magnetic sensors for detecting magnetism. The first sensor 43A and the second sensor 43B are disposed to have a space therebetween in the machine width direction and are disposed to positionally coincide to each other in the longitudinal direction of the cylinder tube 36.

The first sensor 43A corresponds to the first detected object 42A so as to detect the first detected object 42A. Specifically, the first sensor 43A includes a base member 48A movable together with the piston rod 37, and a detection element 49A for detecting the magnets 47A. While the base member 48A moves together with the piston rod 37, the detection element 49A scans the magnets 47A one after another, thereby detecting any portion of the first detected object 42A between the first and second ends of the first detected object 42A.

The second sensor 43B corresponds to the second detected object 42B so as to detect the second detected object 42B. Specifically, the second sensor 43B includes a base member 48B movable together with the piston rod 37, and a detection element 49B for detecting the magnet 47B. Due to the movement of the base member 48B together with the piston rod 37, the detection element 49B detects a portion of the second detected object 42B between first and second ends of the second detected object 42B.

Figure 9:
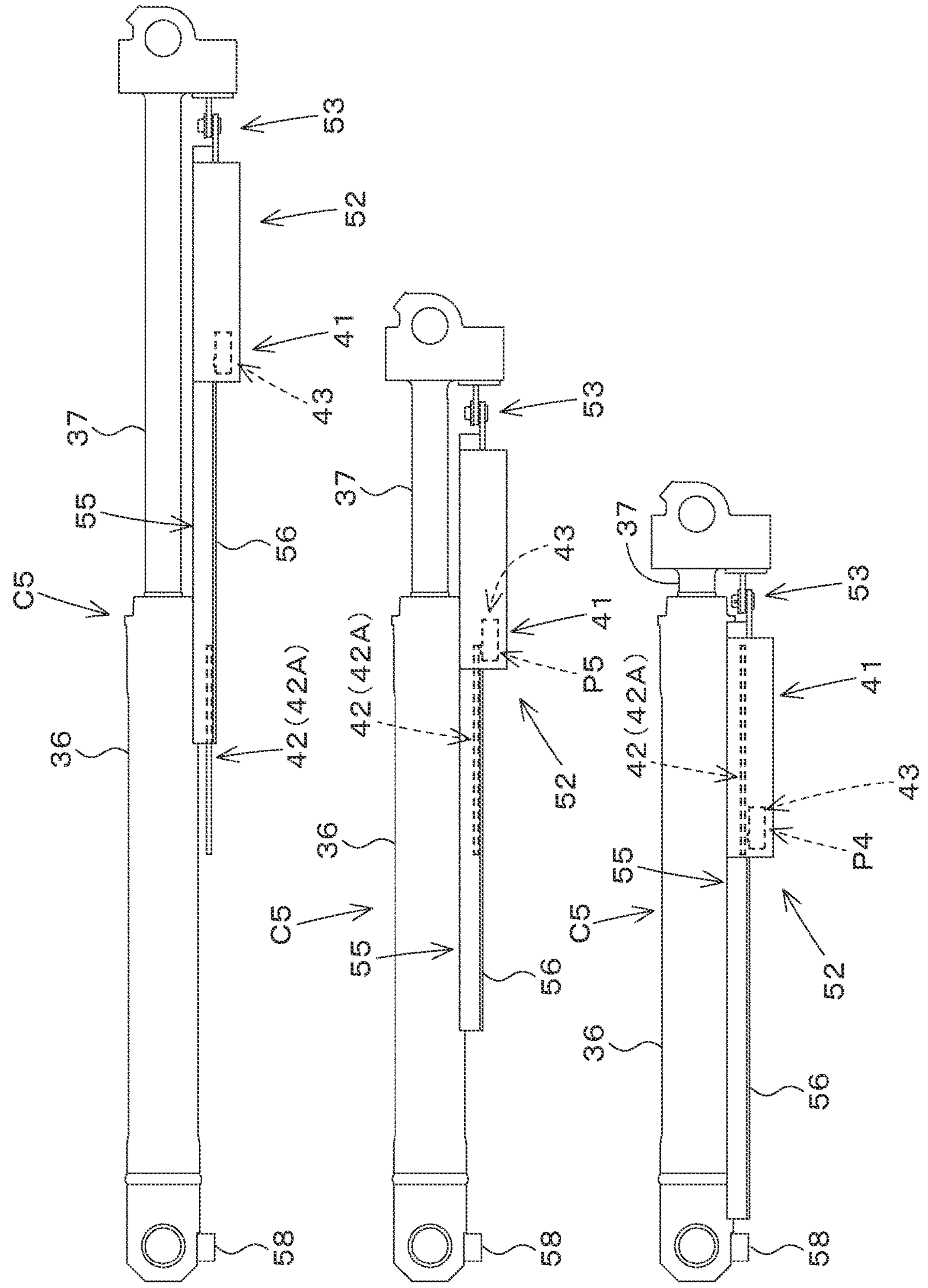
FIG. 9 is a side view of the working tool cylinder in telescoping movement.

FIGS. 5 and 6 and the lowest drawing of drawings in FIG. 9 illustrate the working tool cylinder C5 in the fully contracted state. In this state, the working tool 24 is disposed at the dump position P1 (see FIG. 3). In the fully contracted state of the working tool cylinder C5, the detector 43 is disposed at a first position P4 corresponding to the second end of the first detected object 42A. At this time, the first sensor 43A detects the first detected object 42A while the second sensor 43B does not detect the second detected object 42B. When the working tool cylinder C5 extends from the fully contracted state, the detector 43 moves together with the piston rod 37. Accordingly, the detector 43 keeps detecting the first detected object 42A until the detector 43 reaches a second position P5 corresponding to the first end of the first detected object 42A as illustrated by the middle drawing of FIG. 9. On the other hand, the second sensor 43B detects the second detected object 42B while the detector 43 moves from a position slightly before the second position P5 to the second position P5. The position of the working tool 24, when the detector 43 is disposed at the second position P5, is referred to as a first predetermined position P3 (see FIG. 3).

At the second position P5 and in the vicinity thereof, the first sensor 43A detects the first detected object 42A and the second sensor 43B detects the second detected object 42B, thereby enhancing the reliability of the detection device 41 when at the second position P5 and in the vicinity thereof.

After the detected object 42 passes the second position P5 by further extension movement of the working tool cylinder C5 from the state illustrated by the middle drawing in FIG. 9, the detector 43 no further detects the detected object 42 until the working tool cylinder C5 is fully extended as illustrated by the highest drawing in FIG. 9.

Referring to FIG. 3, the first predetermined position P3 is set between the dump position P1 and the crowd position P2, and the detection device 41 detects the existence of the working tool 24 when it is in a predetermined range E1 between the first predetermined position P3 and the dump position P1. Specifically, the predetermined range E1 ranges from the first predetermined position P3 to the dump position P1.

Referring to FIG. 3, a reference numeral T1 designates a movement locus of the tip end portion 24B of the working tool 24 swinging from the dump position P1 to the crowd position P2, and a reference numeral O1 designates a middle point of the movement locus T1. The movement range of the tip end portion 24B from the middle point O1 to the dump position P1 is defined as a dump side in the swing range of the working tool 24, and the movement range of the tip end portion 24B from the middle point O1 to the crowd position P2 is defined as a crowd side in the swing range of the working tool 24. On this assumption, the detection device 42 detects the existence of the working tool 24 when it is in the predetermined range E1 on the dump side in the swing range thereof.

An attachment structure 51 configured to attach the detector 43 to the piston rod 37 will now be described.

Referring to FIGS. 5 to 7, the attachment structure 51 includes a detector mount 52, to which the detector 43 is attached, and a connection mechanism 53 to connect the detector mount 52 to the piston rod 37.

The detector mount 52 includes a mount main body 54, a supporter 55 for supporting the mount main body 54 on the attachment plate 44, and a cover plate 56 for covering the detected object 42.

The mount main body 54 includes a base wall 54*a*, a first side wall 54*b*, a second side wall 54*c*, a first end wall 54*d* and a second end wall 54*e*. The base wall 54*a* is disposed between the working tool cylinder C5 and the arm 23. The first side wall 54*b* extends from a left end of the base wall 54*a*. The second side wall 54*c* extends from a right end of the base wall 54*a*. The first end wall 54*d* is provided on a first end portion of the base wall 54*a*, i.e., an end portion of the base wall 54*a* on the rod-side of the cylinder tube 36. The second end wall 54*e* is provided on a second end portion of the base wall 54*a*, i.e., another end portion of the base wall 54*a* on the bottom-side of the cylinder tube 36.

Referring to FIG. 5, the base wall 54*a* faces the detected object 42 when the working tool cylinder C5 is fully contracted. An attachment block 57 is fixed to the second end portion of the base wall 54*a*. The first sensor 43A is attached to the left side of the attachment block 57. The second sensor 43B is attached to the right side of the attachment block 57.

Referring to FIG. 7, the supporter 55 includes a first slide member 55A on the left side thereof, and includes a second slide member 55B on the right side thereof. The first slide member 55A is formed to have a rightward open groove into which the first fitting portion 44A is fitted so that the first slide member 55A is movable relative to the attachment plate 44 in the longitudinal direction of the cylinder tube 36. The second slide member 55B is formed to have a leftward open groove into which the second fitting portion 44B is fitted so that the second slide member 55B is movable relative to the attachment plate 44 in the longitudinal direction of the cylinder tube 36. The first slide member 55A is fixed to the first side wall 54*b*, and the second slide member 55B is fixed to the second side wall 54*c*. Accordingly, the attachment block 57 is supported by the attachment plate 44 via the supporter 55 movably relative to the attachment plate 44 in the longitudinal direction of the cylinder tube 36.

Referring to FIG. 5, the supporter 55 protrudes from the mount main body 54 to the bottom side and to the rod side. The portion of the supporter 55 protruding to the bottom side from the mount main body 54 extends from the detector mount 52 to the vicinity of a cover member 58 covering a grease nipple as shown in the lowest drawing in FIG. 9.

Figure 8:
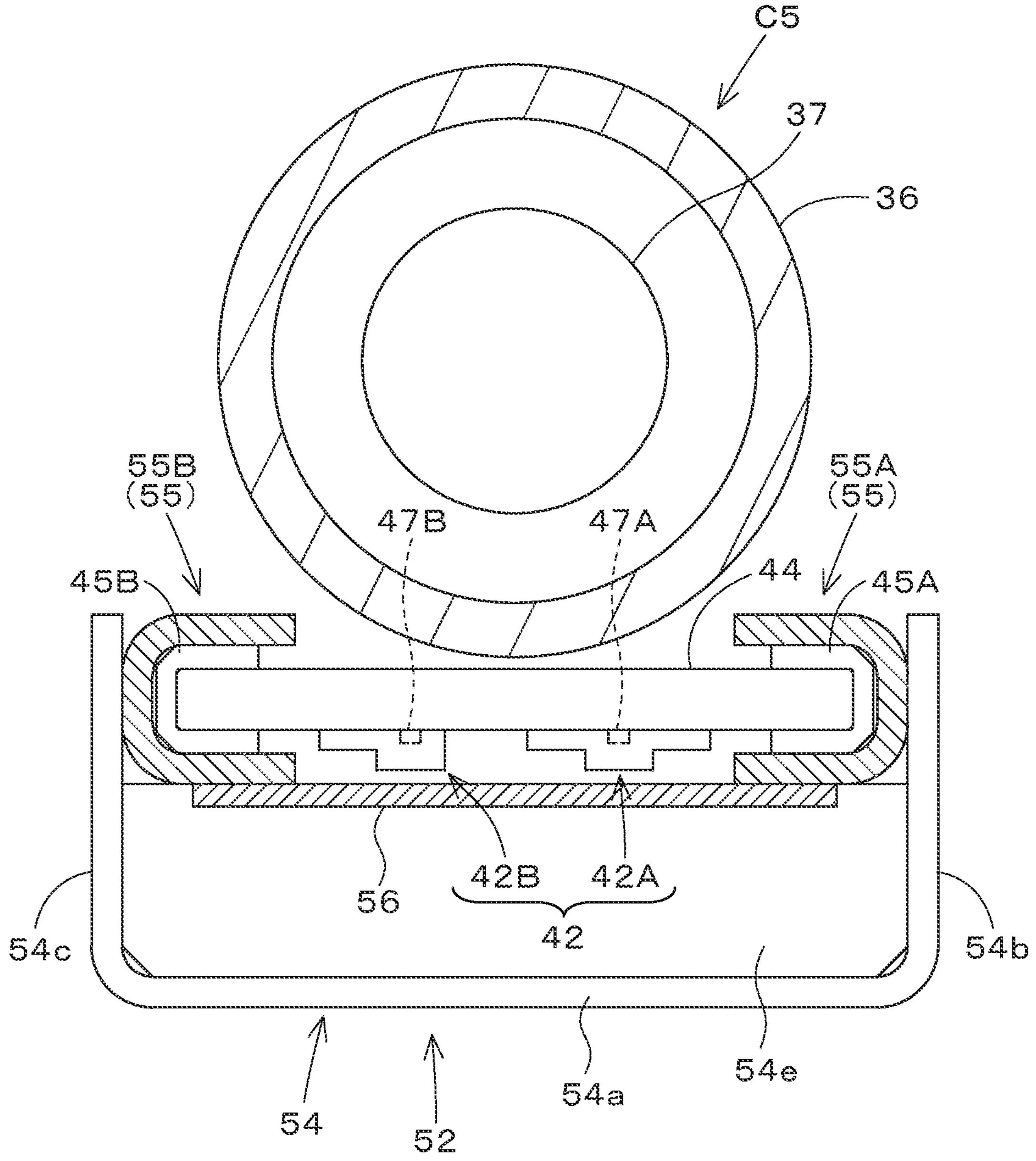
FIG. 8 is a cross sectional view taken along Z2-Z2 line of FIG. 5.

Referring to FIG. 8, the cover plate 56 is disposed on the side of the attachment plate 44 opposite to the working tool cylinder C5 so as to connect the first slide member 55A and the second slide member 55B to each other. Referring to FIG. 5, the cover plate 56 is fixed at a first end thereof to the second end wall 54*e* of the mount main body 54.

Referring to FIG. 9, the cover plate 56 is extended to have a second end defining an end portion of the supporter 55. When the working tool cylinder C5 is extended, the cover plate 56 moves together with the piston rod 37 so as to cover the detected object 42.

Referring to FIGS. 5 and 6, the connection mechanism 53 includes a first connection piece 59, a second connection piece 60 and a connection pin 61. The first connection piece 59 is joined to the piston rod 37. Specifically, the first connection piece 59 is fixed to a fixture plate 62 attached to the rod head 37A. The second connection piece 60 is joined to the mount main body 54 (of the detector mount 52). Specifically, the second connection piece 60 includes a first portion 60*a* and a second portion 60*b*. The first portion 60*a* is fixed to the first end wall 54*d* of the mount main body 54 so as to connect the first slide member 55A and the second slide member 55B to each other. The second portion 60*b* extends from the first portion 60*a* toward the rod head 37A. The connection pin 61 is passed through the first connection piece 59 and the second connection piece 60 so as to couple the first and second connection pieces 59 and 60 to each other. Specifically, referring to FIG. 5, the first connection piece 59 and the second portion 60*b* of the second connection piece 60 face each other in the radial direction of the piston rod 37 so as to have a space 63 therebetween, and the connection pin 61 is passed through the space 63.

Figure 10:
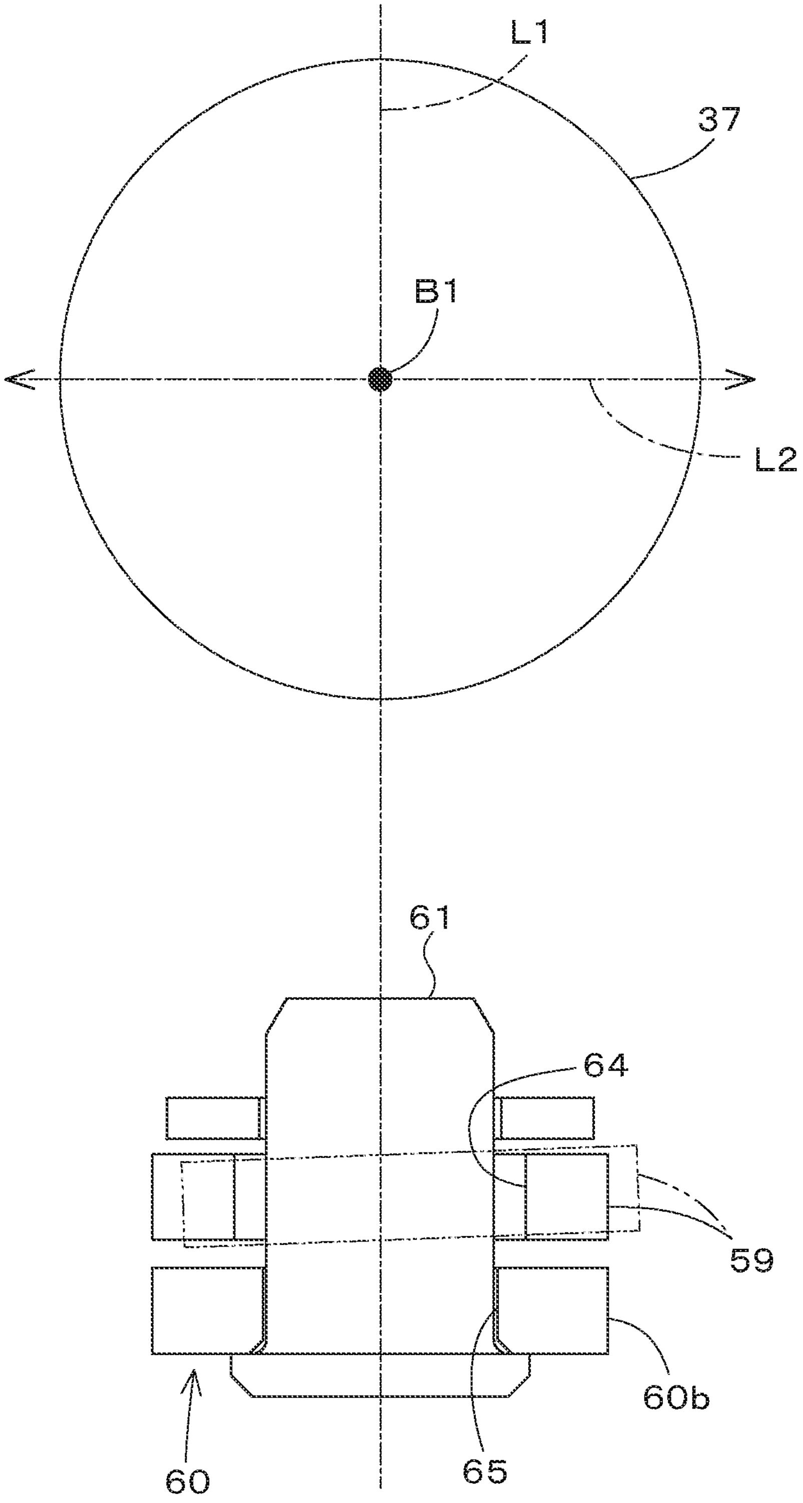
FIG. 10 is a cross sectional view taken along Z3-Z3 line of FIG. 5.

Referring to FIG. 10, the first connection piece 59 is formed with a first pin hole 64 through which the connection pin 61 is passed. The first pin hole 64 is formed into a long hole shape such as to allow the piston rod 37 to rotate around an axis B1 of the piston rod 37. Specifically, an extension line L1 of the axis of the connection pin 61 is perpendicular to the axis of the piston rod 37. The long hole serving as the first pin hole 64 elongates parallel to a direction L2 perpendicular to the extension line L1 and the axis B1.

The second portion 60*b* of the second connection piece 60 is formed with a second pin hole 65 through which the connection pin 61 is passed. The second pin hole 65 is formed into a circular hole shape.

Due to backlash of the cylinder shaft 35 in a cylinder shaft passage hole penetrating the rod head 37A and the cylinder bracket 34, the piston rod 37 is allowed to slightly rotate around the axis B1 thereof so that the first connection piece 59 is allowed to swing according to the rotation of the piston rod 37.

FIGS. 11 to 14 illustrate an alternative embodiment.

Figure 11:
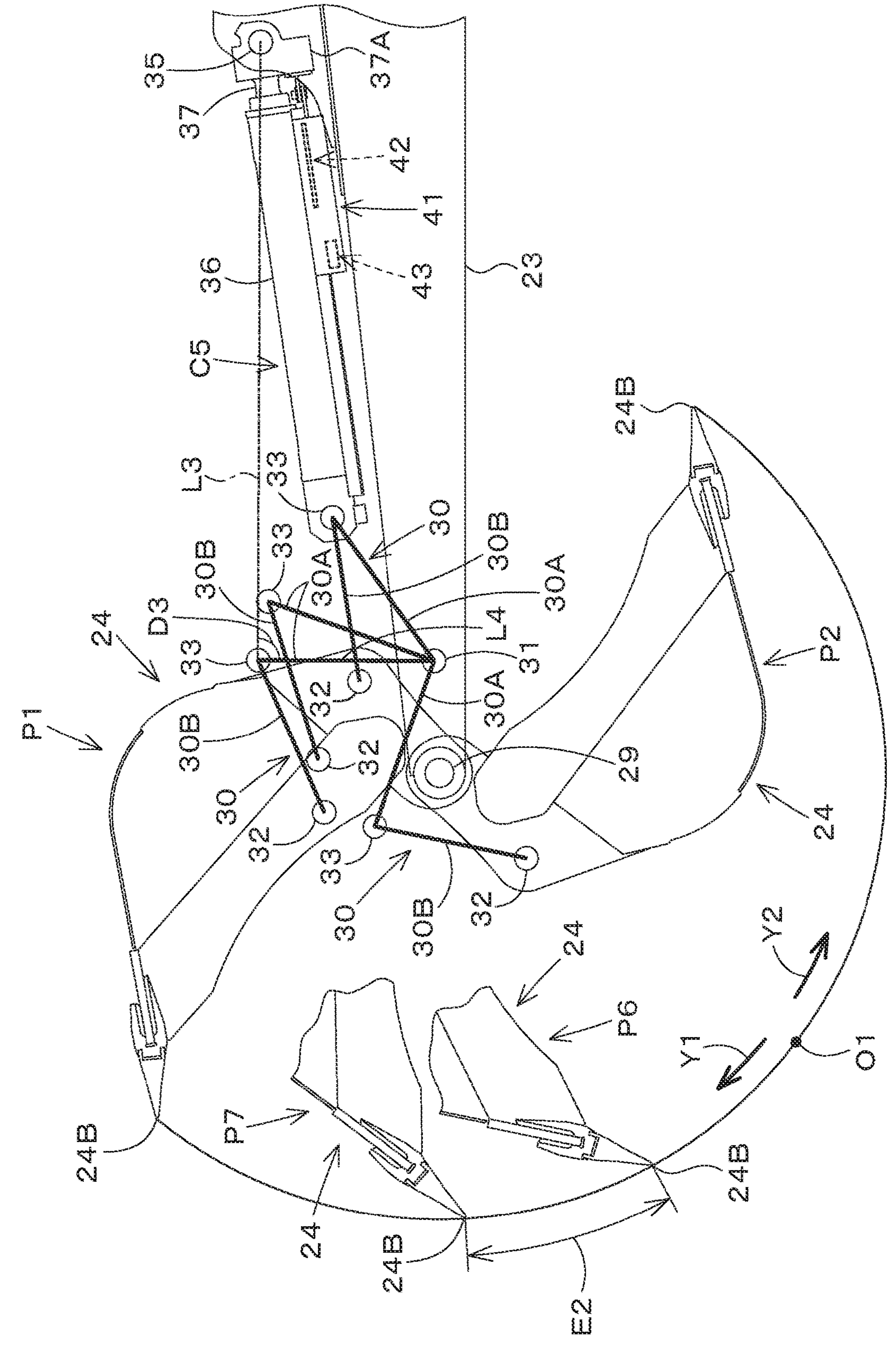
FIG. 11 is a side view of a working tool in operation according to an alternative embodiment.

In the alternative embodiment, referring to FIG. 11, a second predetermined position P7 is set between a first predetermined position P6 and the dump position P1, and the detection device 41 detects the existence of the working tool 24 when it is in a predetermined range E2 ranging from the first predetermined position P6 to the second predetermined position P7. In the alternative embodiment, the first predetermined position P6 is defined as a position where an angle D3 between a line L3 connecting the axial center of the cylinder shaft 35 to the axial center of the connection shaft 33 and a line L4 connecting the axial center of the first link shaft 31 to the axial center of the connection shaft 33 becomes a substantially right angle.

Figure 12:
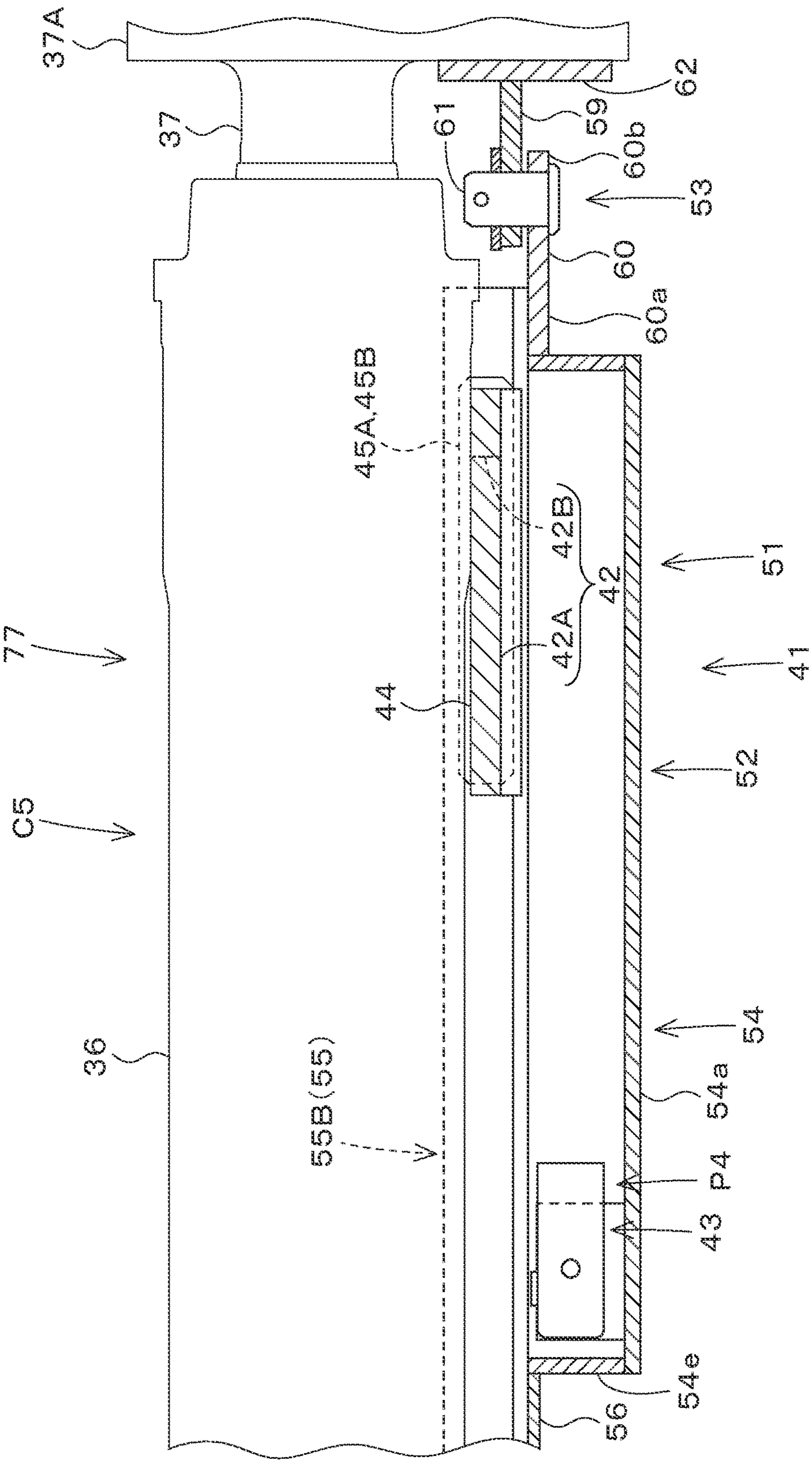
FIG. 12 is a sectional side view of a detection device arranged according to the alternative embodiment.
Figure 13:
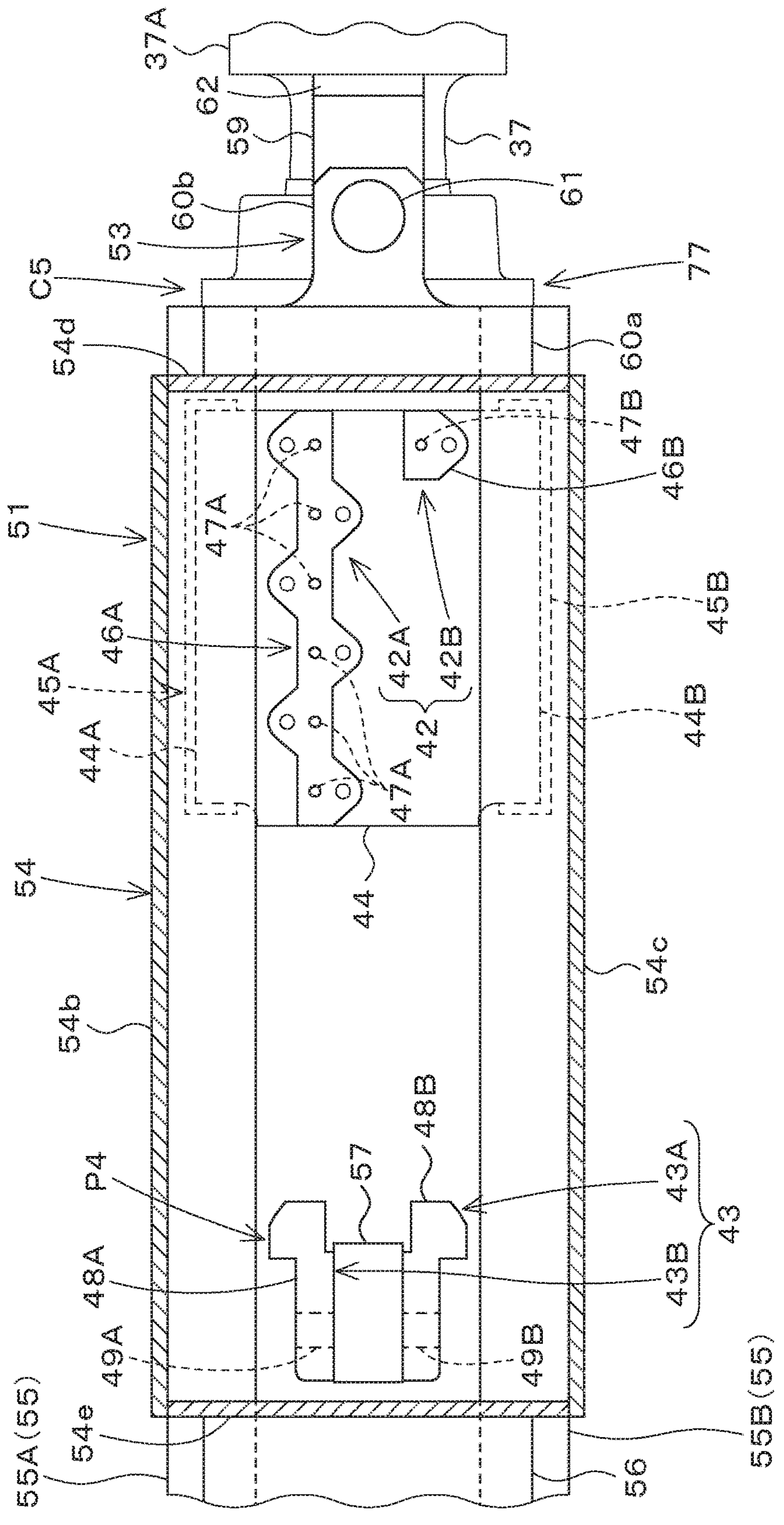
FIG. 13 is a sectional side view of the detection device arranged according to the alternative embodiment.
Figure 14:
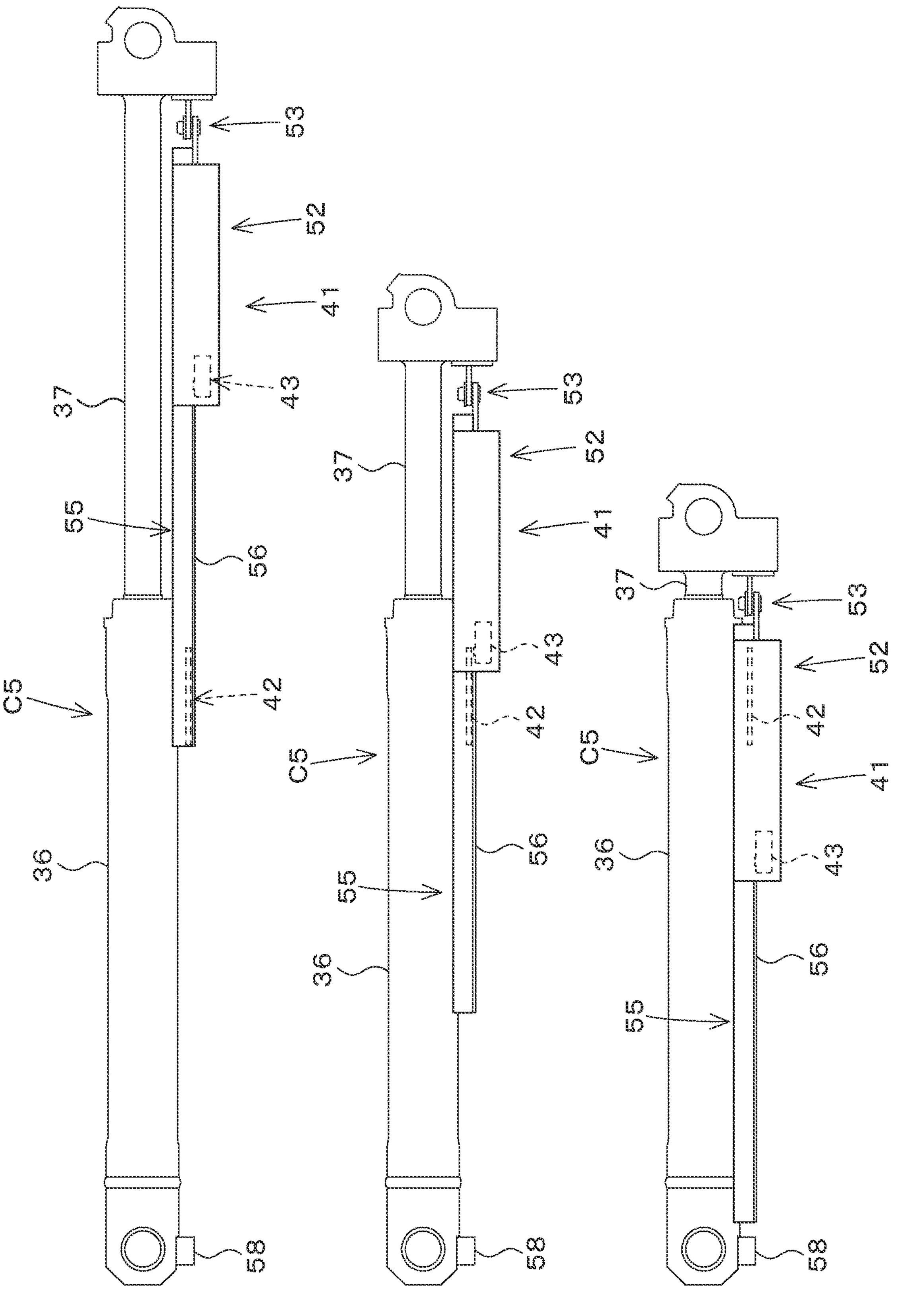
FIG. 14 illustrates side views of a working cylinder according to the alternative embodiment in different telescopic movement states.
Figure 15:
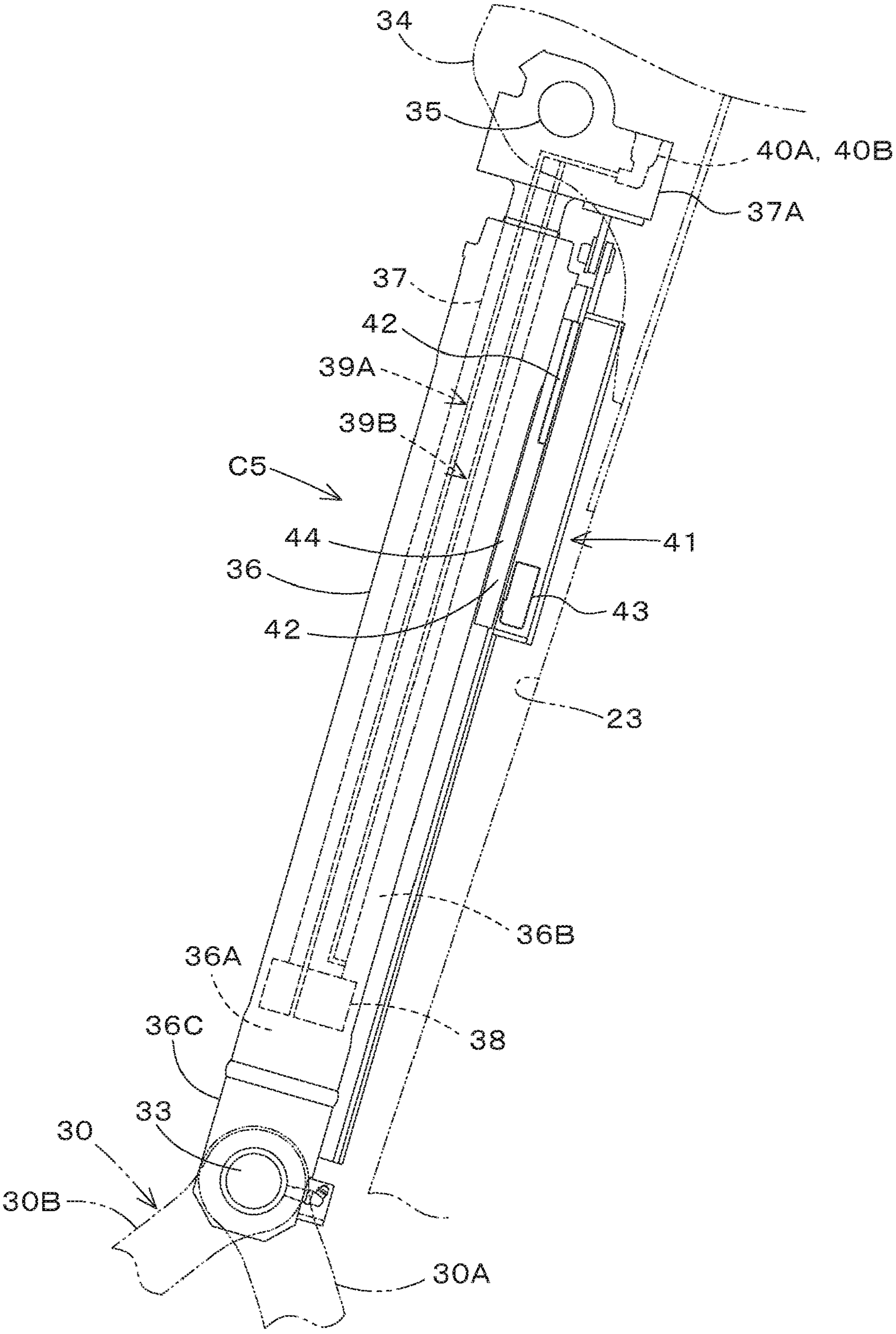
FIG. 15 is a side view of the working tool cylinder.

Referring to FIGS. 12 and 13 and the lowest drawing of drawings in FIG. 14, when the working tool cylinder C5 is fully contracted, the detector 43 is separated from the detection device 42 so that the detection device 41 does not detect the working tool 24. While the working tool cylinder C5 is extended from the fully contracted state, the detection device 41 does not detect the working tool 24 before the first sensor 43A reaches a position corresponding to the second end of the first detected object 42A.

When the first sensor 43A located at the position corresponding to the second end of the first detected object 42A detects the first detected object 42A, the detection device 41 detects the existence of the working tool 24 at the second predetermined position P7. While the working tool cylinder C5 is extended further from this extension state, the working tool 24 is detected until the detector 43 reaches a position corresponding to the first end of the detected object 42. When the detector 43 reaches the position corresponding to the first end of the detected object 42 and detects the first detected object 42A and the second detected object 42B, the detection device 41 detects the existence of the working tool 24 at the first predetermined position P6. Accordingly, while the working tool 24 is in the predetermined range E2 ranging from the first predetermined position P6 to the second predetermined position P7, the detection device 41 detects the existence of the working tool 24 in the predetermined range E2.

In FIG. 14, lowest, middle and highest drawings indicate different telescopic movement states of the working tool cylinder C5. The lowest drawing illustrates the working tool cylinder C5 when it is fully contracted. The middle drawing illustrates the working tool cylinder C5 when the working tool 24 is located at the first predetermined position P6. The highest drawing illustrates the working tool cylinder C5 when it is fully extended.

In the alternative embodiment, as illustrated by the highest drawing in FIG. 14, the detected object 42 is covered with the cover plate 56 without protruding from the cover plate 56 even when the working tool cylinder C5 is fully extended.

All constitution elements of the alternative embodiment except for the above-mentioned elements are identical or similar to those of the foregoing embodiment shown in FIGS. 1 to 10.

Further alternative embodiments will now be described with reference to FIGS. 15 to 23.

In the embodiments shown in FIGS. 15 to 23, the detection device 41 and the attachment structure 51 are identical or similar to those shown in FIGS. 7, 8, 12 and 13. Illustration and description of the structures identical or similar to those of the foregoing embodiments will be omitted.

Figure 17:
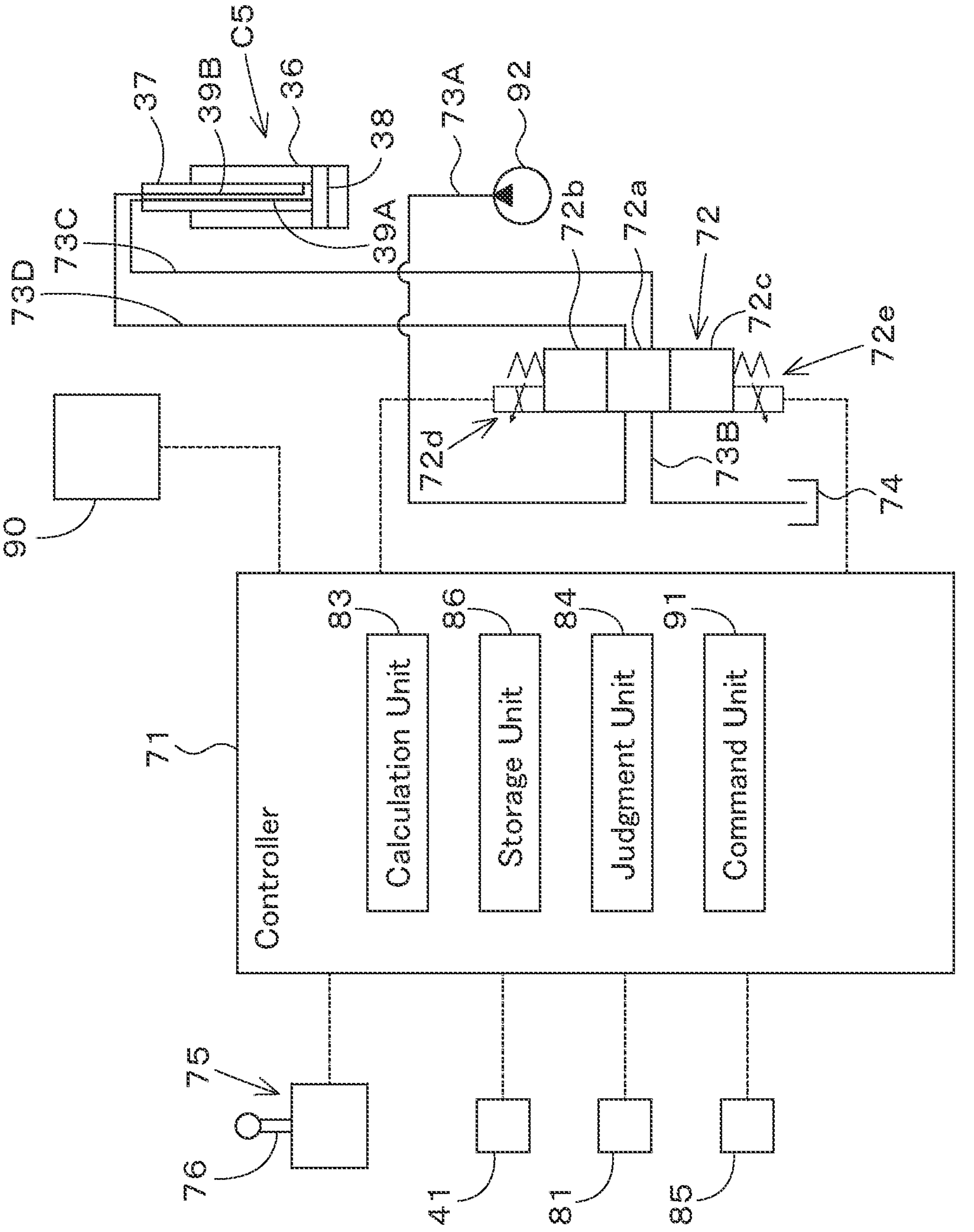
FIG. 17 is a schematic diagram of a control system.

In the present embodiments, referring to FIG. 17, the working machine 1 includes a controller 71 for controlling the swing of the bucket (working tool) 24, and includes a bucket control valve 72 for controlling the bucket cylinder C5. The controller 71 is constituted by a microcomputer including CPU (Central Processing Unit) and EEPROM (Electrically Erasable Programmable Read-Only Memory), for example.

The bucket control valve 72 is a control valve electrically controlled by the controller 71. For example, a proportional directional solenoid valve serves as the bucket control valve 72. The proportional directional solenoid valve is a valve in which a main spool is moved by a solenoid to control the flow of hydraulic fluid. The bucket control valve 72 is a three position shift valve shiftable among a neutral position 72*a*, a first position 72*b* and a second position 72*c*. The bucket control valve 72 includes a first solenoid 72*d* and a second solenoid 72*e*. The first solenoid 72*d* and the second solenoid 72*e* are electrically connected to the controller 71 so that each of the first and second solenoids 72*d* and 72*e* is excited or unexcited according to a command signal outputted from the controller 71. Due to the excitation or non-excitation of each of the first and second solenoids 72*d* and 72*e*, the bucket control valve 72 is shiftable from the neutral position 72*a* to either the first position 72*b* or the second position 72*c*.

The bucket control valve 72 is fluidly connected to a hydraulic pump 92 via a supply fluid passage 73A, and to a tank 74 via a drain fluid passage 73B. The bucket control valve 72 is fluidly connected to the piston rod 37 of the bucket cylinder C5 via a first cylinder fluid passage 73C and a second cylinder fluid passage 73D. Specifically, the first cylinder fluid passage 73C is fluidly connected to the first fluid passage 39A, and the second cylinder fluid passage 73D is fluidly connected to the second fluid passage 39B.

Referring to FIG. 17, an operation member 75 for operating the bucket 24 is electrically connected to the controller 71. The controller 71 can obtain an operation signal (electric signal) from the operation member 75. The operation member 75 is disposed adjacent to the operator seat 6 and includes a lever 76 which can be gripped and operated by an operator. The lever is swingable from its neutral position in first and second directions opposite to each other. For example, when the level 76 is swung in the first direction, the first solenoid 72*d* is excited to shift the bucket control valve 72 to the first position 72*b*. Due to the shift of the bucket control valve 72 to the first position 72*b*, the bucket cylinder C5 is contracted to swing the bucket 24 in the dump direction Y1. When the level 76 is swung in the second direction, the second solenoid 72*e* is excited to shift the bucket control valve 72 to the second position 72*c*. Due to the shift of the bucket control valve 72 to the second position 72*c*, the bucket cylinder C5 is extended to swing the bucket 24 in the crowd direction Y2. When the lever 76 is returned to its neutral position, the bucket control valve 72 returns to the neutral position 72*a* to stop the telescopic movement of the bucket cylinder C5, i.e., to stop the movement of the bucket 24.

Figure 16:
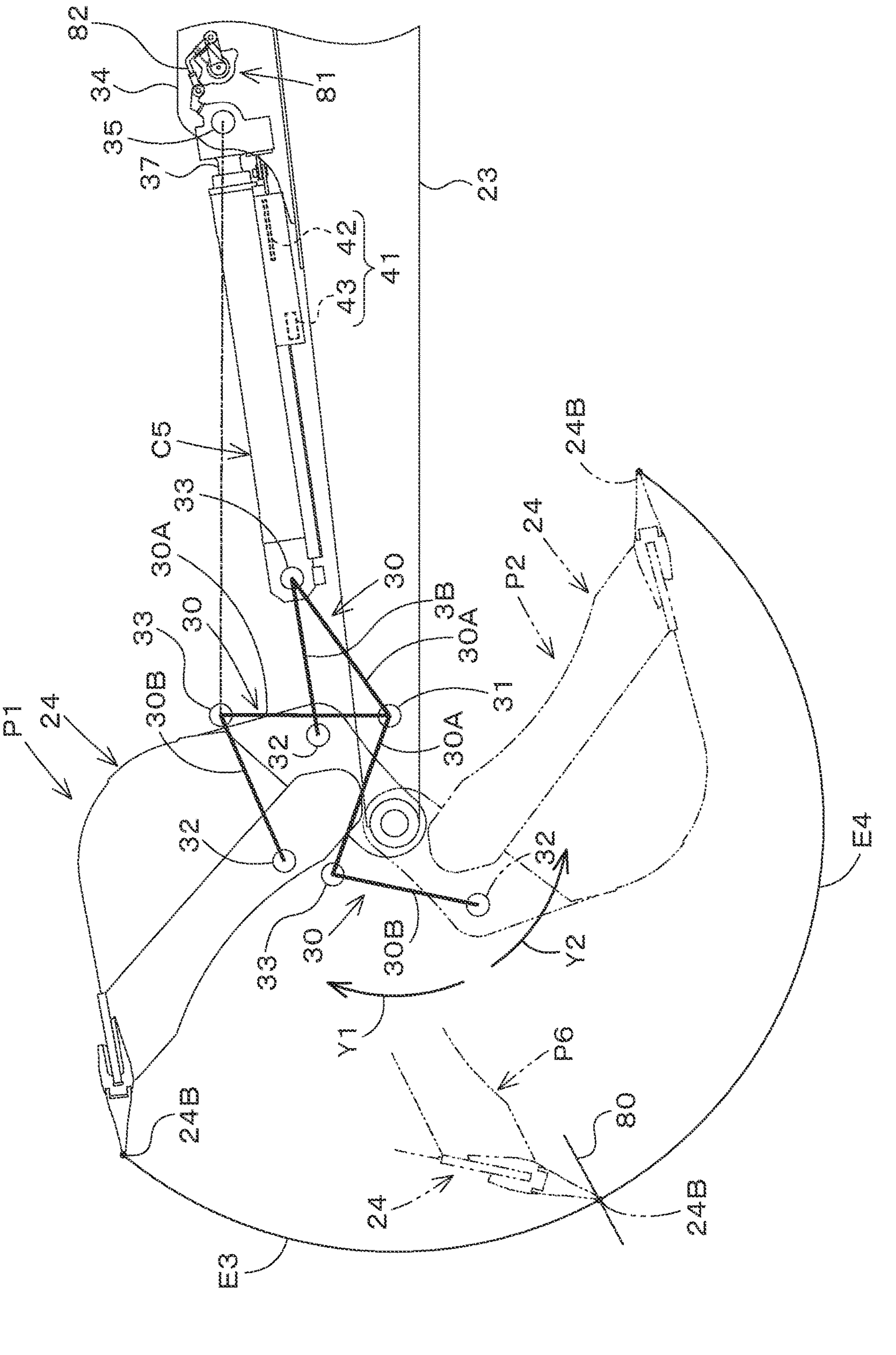
FIG. 16 is a side view of the working tool in operation.
Figure 18:
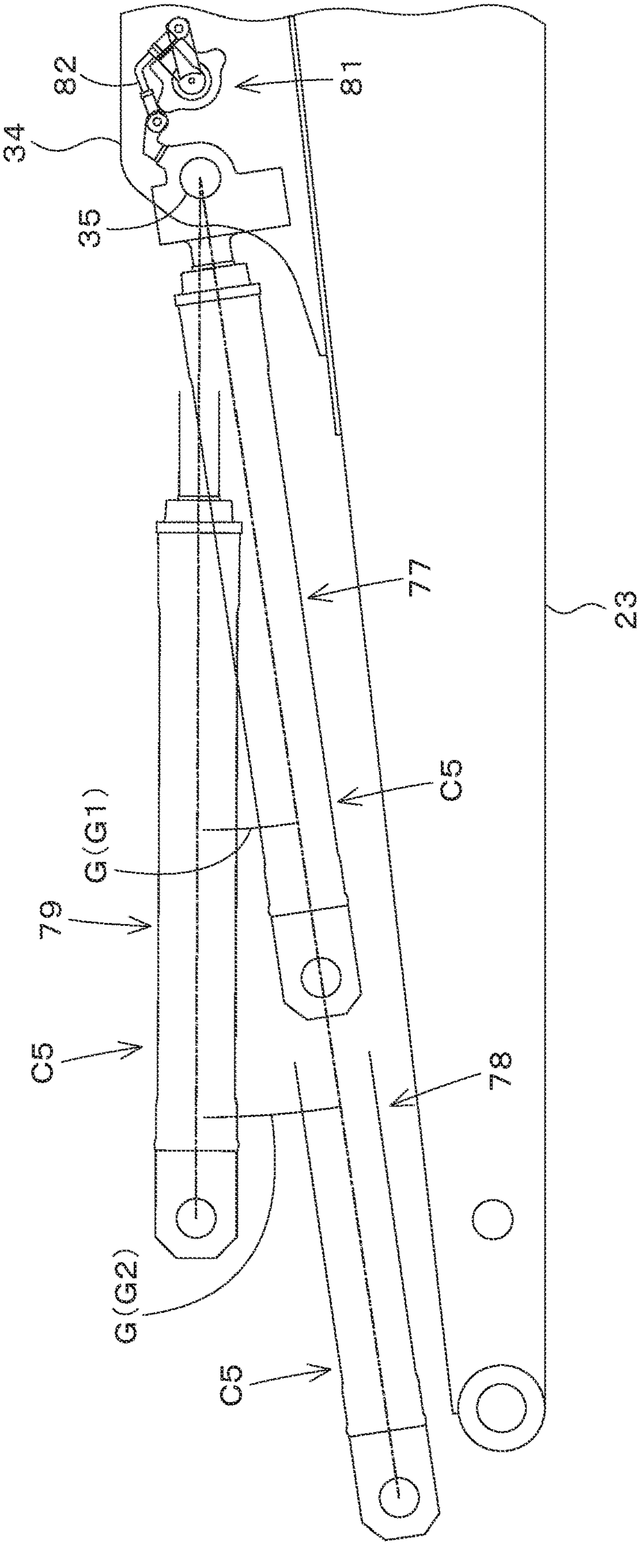
FIG. 18 illustrates side views of the working cylinder in different swing states.

Referring to FIG. 18, the bucket cylinder C5, when in a fully contracted state 77, is disposed parallel and adjacent to the arm 23. Assuming that the bucket cylinder C5 is extended from the fully contracted state 77 to a fully extended state 78, in a first stage of the extension movement of the bucket cylinder C5, the bucket cylinder C5 swings away from the arm 23 so as to increase a swing angle G of the bucket cylinder C5. After passing a halfway point of the extension movement of the bucket cylinder C5, the swing direction of the bucket cylinder C5 relative to the arm 23 is reversed so that the bucket cylinder C5 approaches the arm 23 so as to gradually reduce the swing angle G of the bucket cylinder C5. In FIG. 18, a reference numeral 79 designates a turning point as the halfway point of extension or contraction movement of the bucket cylinder C5, where the variation direction of the swing angle G of the bucket cylinder C5 is reversed between the increasing direction and the reducing direction, i.e., where the swing angle G becomes maximum. In FIG. 16, a reference numeral P6 designates a position of the bucket 24 when the bucket cylinder C5 is at the turning point 79. The following description is given on an assumption that the state where the bucket cylinder C5 is disposed at the turning point 79 and the bucket 24 is disposed at the position P6 is referred to as a neutral position 80. In other words, the neutral position 80 is conceptual. Referring to FIG. 16, the neutral position 80 corresponding to the turning point 79 of the bucket cylinder C5 defines the border between the dump side E3 and the crowd side E4 in the swing range of the bucket 24.

Referring to FIG. 18, an angle sensor 81 is attached to the cylinder bracket 34 so as to detect the swing angle G of the bucket cylinder C5 around the cylinder shaft 35. The angle sensor 81 is constituted by a potentiometer, for example. The angle sensor 81 detects a swing angle G1 on the dump side E3 from the neutral position 80 and a swing angle G2 on the crowd side E4 from the neutral position 80. The angle sensor 81 is linked to the rod head 37A of the bucket cylinder C5 by a linkage 82. Accordingly, the angle sensor 81 with the linkage 82 detects the rotation of the rod head 37A around the cylinder shaft 35, thereby detecting the swing angel G of the bucket cylinder C5 around the cylinder shaft 35. Alternatively, the angle sensor 81 may have no linkage to directly detect the rotation of the bucket cylinder C5 around the cylinder shaft 35.

Referring to FIG. 17, the angle sensor 81 is electrically connected to the controller 71. The controller 71 can obtain a detection value (or a potentiometer resistance value) from the angle sensor 81. The controller 71 includes a calculation unit 83. The calculation unit 83 calculates the swing position of the bucket 24 based on the swing angle G of the bucket cylinder C5, i.e., the potentiometer resistance value. The swing position of the bucket 24 is defined as any position of the bucket 24 swinging around the bucket shaft 29.

In the above-mentioned operation mechanism of the bucket 24, because of the reversing of variation direction of the swing angle G of the bucket cylinder C5 at the halfway point of the telescopic movement thereof, it is not clear whether the swing position of the bucket 24 corresponding to the detected swing angle G is on either the dump side E3 or the crowd side E4 with respect to the neutral position 80.

Therefore, referring to FIG. 16, the detection device 41 is provided to detect whether the bucket 24 is on the dump side E3 or the crowd side E4 with respect to the neutral position 80. In other words, the calculation unit 83 of the controller 71 calculates or determines the swing position of the bucket 24 based on the swing angle G detected by means of the angle sensor 81 and detection information as a result of detection by means of the detection device 41.

The detection device 41 detects ON and OFF signals such as to detect the position of the piston rod 37 relative to the cylinder tube 36 during the telescopic movement of the bucket cylinder C5. The detector 43, when detecting the detected object 42, outputs a detection signal to the controller 71. The detection signal may be either the on signal or the off signal.

Figure 19:
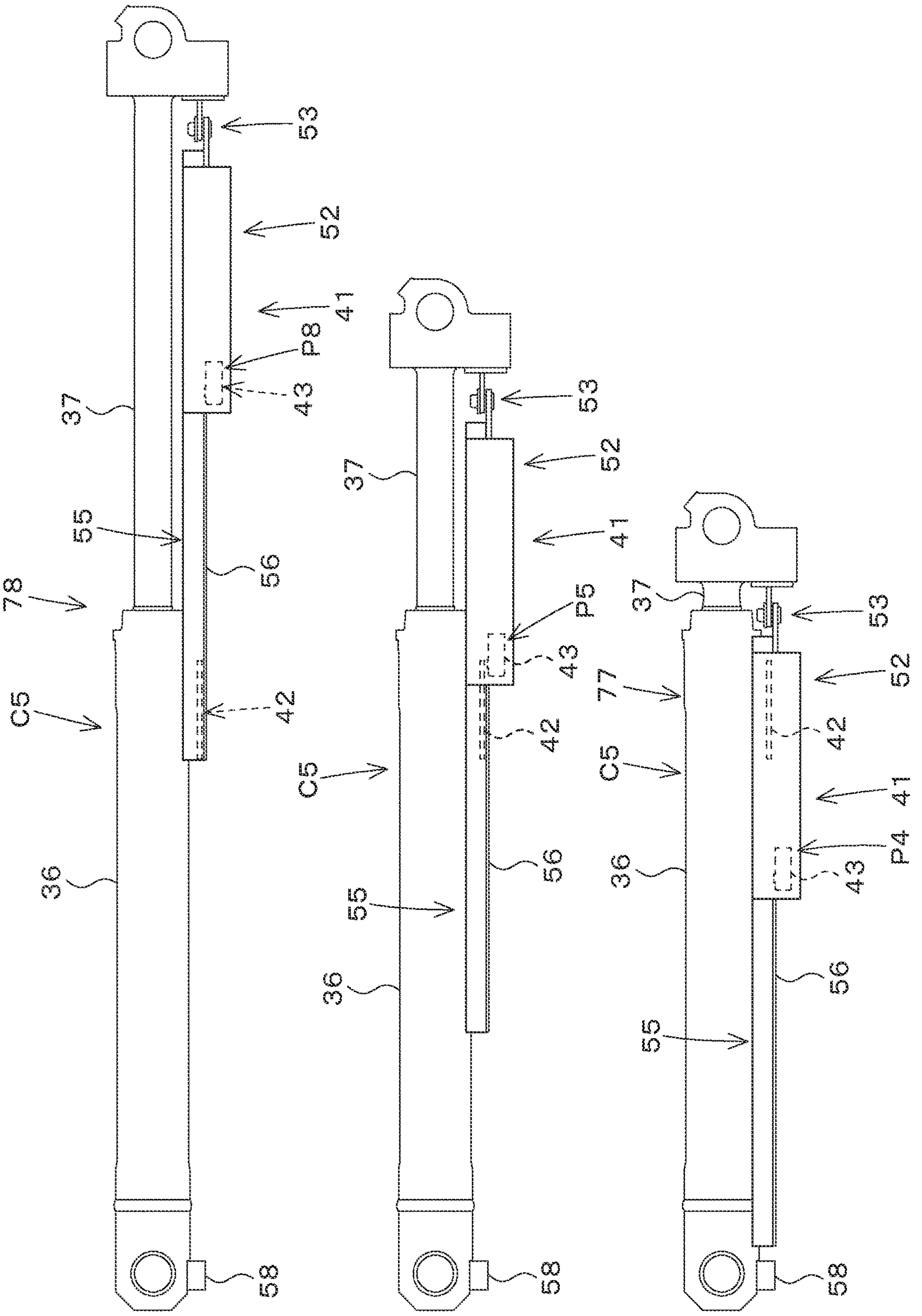
FIG. 19 illustrates side views of the working cylinder in different telescopic movement states.

FIGS. 12 and 13 and the lowest drawing of drawings in FIG. 19 illustrate the bucket cylinder C5 when in the fully contracted state 77. When the bucket cylinder C5 is in the fully contracted state 77, the detector 43 is located at the first position P4 corresponding to the second end of the first detected object 42A. The detector 43 is separated away from the detected object 42 so that the first sensor 43A does not detect the first detected object 42A and the second sensor 43B does not detect the second detected object 42B.

When the bucket cylinder C5 is extended from the fully contracted state 77, the detector 43 moves together with the piston rod 37. At the first stage of the movement of the detector 43, the first sensor 43A detects the first detected object 43A. Referring to the middle drawing of the drawings in FIG. 19, when the detector 43 reaches the second position P5 corresponding to the first end of the first detected object 42A, the second sensor 43B detects the second detected object 42B. The state where the first sensor 43A detects the first detected object 42A and the second sensor 43B detects the second detected object 42B is defined as the neutral position 80. The detector 43 detects the neutral position 80 by detecting the detectable end of the second detected object 42B of the detected object 42.

As illustrated, the detection of the neutral position 80 requires both the detection of the first detected object 42A by means of the first sensor 43A and the detection of the second detected object 42B by means of the second sensor 43B, thereby enhancing the reliability of the detection device 41. Alternatively, the second detected object 42B and the second sensor 43B may be omitted.

While the bucket cylinder C5 is further extended, after the detector 43 passes the second position P5, the detector 43 does not detect the detected object 42 until the bucket cylinder C5 reaches a third position P8 where it is in the fully extended state 78 as illustrated by the highest drawing of the drawings in FIG. 19.

Referring to FIG. 17, the detection device 41 is electrically connected to the controller 71. The controller 71 can obtain detection information from the detection device 41. The controller 71 includes a determination unit 84 such that, based on the detection information from the detection device 41, the determinement unit 84 determines whether the bucket 24 exists on the dump side E3 or the crowd side E4 with respect to the neutral position 80. The working machine 1 includes a switch 85, serving as an instruction input unit, for receiving an instruction input from the operator, the instruction input indicating whether the bucket 24 is on the dump side E3 or the crowd side E4. The switch 85 is disposed adjacent to the operator seat 6. The switch 85 is electrically connected to the controller 71. The controller 71 can obtain an electric signal from the switch 85. The controller 71 includes a storage unit 86.

Figure 20:
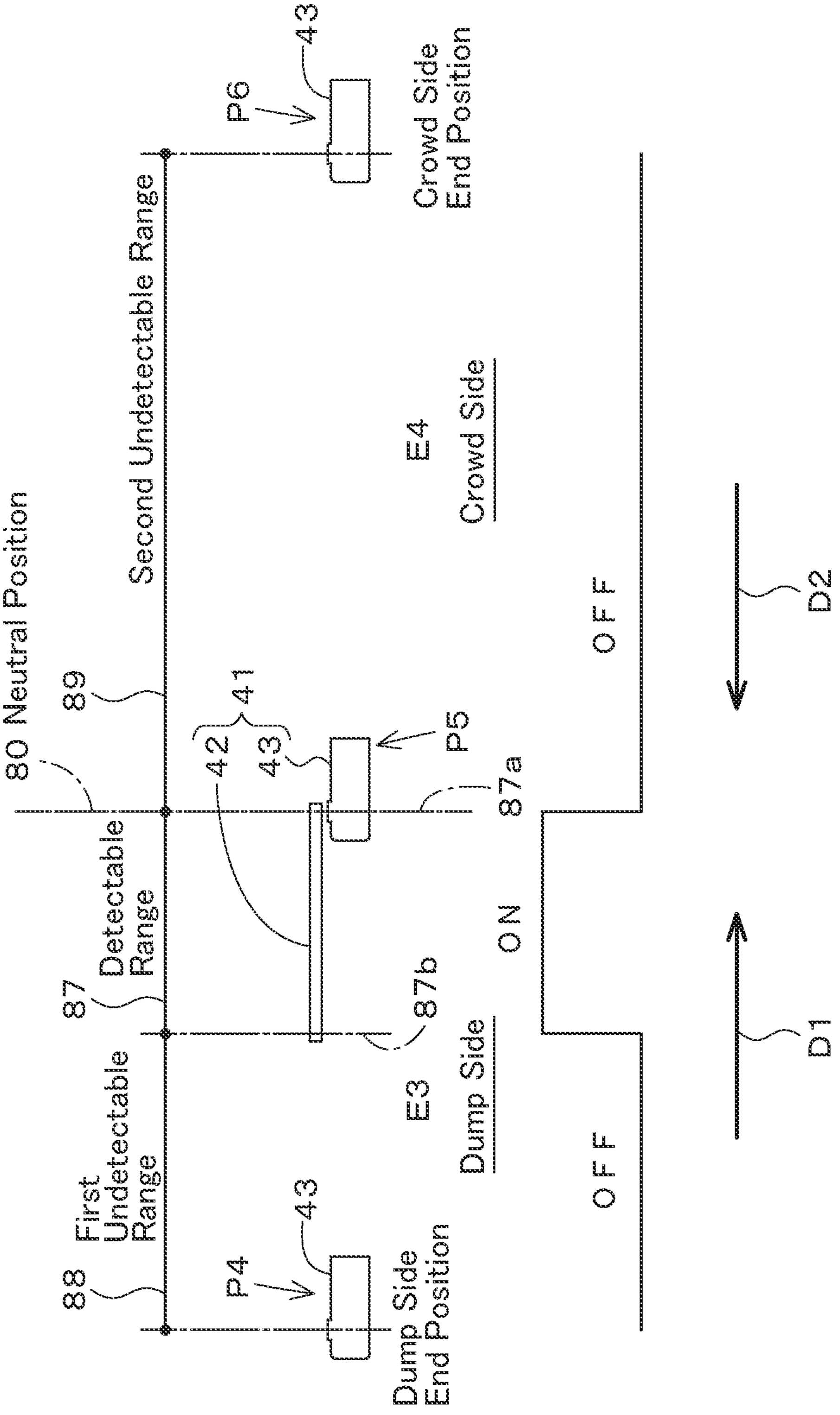
FIG. 20 is a diagram describing detection patterns.

Referring to FIG. 20, the detection device 41 is arranged so that it can find whether the bucket 24, when existing in a detectable range that is a predetermined range as the vicinity of the neutral position 80, is on the dump side E3 or the crowd side E4. In other words, the detection device 41 serves as a sensor for judging whether the bucket 24 exists on the dump side E3 or the crowd side E4 with respect to the neutral position 80. In this embodiment, while the angle sensor 81 alone is insufficient to detect the swing position of the bucket 24 in the vicinity of the neutral position 80 at which the variation direction of the potentiometer resistance value is reversed, the detection information from the detection device 41 is used to determine the swing position of the bucket 24.

Accordingly, the determination of whether the bucket 24 is on the dump side E3 or the crowd side E4 is not performed when the bucket 24 is out of the predetermined range as the vicinity of the neutral position 80. Therefore, at the start of processing to detect the swing angle of the bucket 24, a position confirmation operation, i.e., an initial position determining operation, to determine whether the bucket 24 exists on the dump side E3 or the crowd side E4 is performed while the bucket 24 is out of the predetermined range as the vicinity of the neutral position 80. For example, the position confirmation operation is performed in the following way.

First, the operator temporarily moves the bucket 24 to the dump side E3 or the crowd side E4. When the bucket 24, swung to the dump side E3, reaches the dump position P1, the operator pushes the switch 85 to inform the controller 71 that the bucket 24 is disposed at the dump position P1 on the dump side E3. When the bucket 24, swung to the crowd side E4, reaches the crowd position P2, the operator pushes the switch 85 to inform the controller 71 that the bucket 24 is disposed at the crowd position P2 on the crowd side E4. The controller 71, when informed of the position of the bucket 24, makes the storage unit 86 store the informed position of the bucket 24.

Alternatively, the controller 71 may automatically recognize whether the bucket 24 exists on the dump side E3 or the crowd side E4. Specifically, after the bucket 24, temporarily swung to the dump side E3 or the crowd side E4, reaches the dump position P1 or the crowd position P2, the resistance value of the potentiometer serving as the angle sensor 81 varies no further from that corresponding to the bucket 24 at the dump position P1 or the crowd position P2. Therefore, if the state where the resistance value no further varies continues for a predetermined period, the controller 71 may automatically detect that the bucket 24 is disposed at the dump position P1 or the crowd position P2. The controller 71, when automatically recognizing the position of the bucket 24, makes the storage unit 86 store the recognized position of the bucket 24.

Description will now be given of the determination of whether the bucket 24 in the vicinity of the neutral position 80 exists on the dump side E3 or the crowd side E4.

Referring to FIG. 20, in this embodiment, a detectable range 87 for the detector 43 to detect the detected object 42 ranges from the neutral position 80 to an intermediate position between the neutral position 80 and the end position on the dump side E3. For example, the detection device 41, when in the detectable range 87, is turned on, while the detection device 41, when out of the detectable range 87, i.e., when in a first undetectable range 88 or a second undetectable range 89, is turned off. In other words, the neutral position 80 is defined as a border between the turn-on range and the turn-off range. The voltage of the angle sensor 81, when detecting the swing angle of the bucket cylinder C5 in the vicinity of the neutral position 80, is known. Therefore, if the angle sensor 81 is turned on while the voltage of the angle sensor 81 indicates that when detecting in the vicinity of the neutral position 80, the determination unit 84 determines the bucket 24 as being on the dump side E3. If the angle sensor 81 is turned off while the voltage of the angle sensor 81 indicates that when detecting in the vicinity of the neutral position 80, the determination unit 84 determines the bucket 24 as being on the crowd side E4.

It is assumed that the detector 43 is disposed in the first undetectable range 88 and then the bucket 24 (or the piston rod 37) is moved in a first direction D1 defined as a direction from the dump side E3 to the crowd side E4. On this assumption, the detection device 41 is turned on as soon as the detector 43 enters the detectable range 87. When the bucket 24 (or the piston rod 37) is further moved in the first direction D1 and the detector 43 leaves the detectable range 87 and enters the second undetectable range 89, the detection device 41 is turned off. Accordingly, the determination unit 84 determines the bucket 24 as being on the crowd side E4. In this way, a first detection pattern appearing in the ON/OFF signal detection by means of the detection device 41 during the movement of the bucket 24 (or the piston rod 37) in the first direction D1 is indicated as "OFF-to-ON-to-OFF" ("Non-detection to Detection to Non-detection"). The result of determination by the determination unit 84 is stored in the storage unit 86. After the bucket 24 in the vicinity of the neutral position 80 is determined as being on the crowd side E4, while the bucket 24 is swung further on the crowd side E4 so as to move the detector 43 toward the crowd-side end position, the controller 71 keeps the determination, stored in the storage unit 86, that the bucket 24 is on the crowd side E4.

It is assumed that the detector 43 is disposed in the second undetectable range 89 and then the bucket 24 (or the piston rod 37) is moved in a second direction D2 defined as a direction from the crowd side E4 to the dump side E3. On this assumption, the controller 71 keeps the determination, stored in the storage unit 86, that the bucket 24 is on the crowd side E4 until the detector 43 reaches a point immediate before the neutral position 80. When the detector 43 passes the neutral position 80, the detection device 41 having been turned off is turned on so that the determination unit 84 determines the bucket 24 as being on the dump side E3. In this way, a second detection pattern appearing in the ON/OFF signal detection by means of the detection device 41 during the movement of the bucket 24 (or the piston rod 37) in the second direction D2 is indicated as "OFF-to-ON" ("Non-detection to Detection"). The controller 71 makes the storage unit 86 store the result of determination that the bucket 24 is on the dump side E3. Afterward, while the piston rod 37 is moved in the second direction D2 and when the piston rod 37 is stopped with the detector 43 left in the first undetectable range 88, the controller 71 keeps the state stored in the storage unit 86, i.e., the state of the bucket 24 being on the dump side E3.

When the bucket 24 is moved again after the bucket 24 is stopped with the detector 43 left in the detectable range 87, the detector 43 leaves the detectable range 87 and enters either the first undetectable range 88 or the second undetectable range 89, thereby causing "ON-to-OFF" pattern. For this reason, the detection device 41 alone is insufficient to determine whether the detector 43 enters the first undetectable range 88 or the second undetectable range 89. To solve the problem, assuming that the detectable range 87 has a first detectable range end 87*a* corresponding to the neutral position 80 and a second detectable range end 87*b* opposite to the first detectable range end 87*b*, when the detector 43 moves from the detectable range 87 to the first undetectable range 88 according to the movement of the piston rod 37 in the second direction D2, a potentiometer resistance value generated at the second detectable range end 87*b* is considered to determine the detector 43 as entering the first undetectable range 88. When the detector 43 moves from the detectable range 87 to the second undetectable range 89 according to the movement of the piston rod 37 in the first direction D1, another potentiometer resistance value generated at the first detectable range end 87*a* corresponding to the neutral position 80 is considered to determine the detector 43 as entering the second undetectable range 89.

Alternatively, the detection device 41, when in the detectable range 87, may be turned off, and the detection device 41, when out of the detectable range 87, may be turned on. In this case, the first detection pattern realized by means of the detection device 41 when the piston rod 37 is moved in the first direction D1 is indicated as "ON-to-OFF-to-ON" (corresponding to "Non-detection to Detection to Non-detection"). The second detection pattern realized by means of the detection device 41 when the piston rod 37 is moved in the second direction D2 is indicated as "ON-to-OFF" (corresponding to "Non-detection to Detection") pattern.

Alternatively, the detectable range 87 for the detector 43 to detect the detected object 42 may range from the neutral position 80 to an intermediate position between the neutral position 80 and the end position on the crowd side E4.

As mentioned above, in this embodiment, the detection device 41 detects ON and OFF signals indicating whether the bucket cylinder C5 is extended or contracted from the neutral position 80. Each of the first detection pattern and the second detection pattern is a combination of ON-to-OFF and OFF-to-ON signal shifts, and the combination as the first detection pattern and the combination as the second detection pattern are different from each other.

Referring to FIG. 17, the working machine 1 includes a display unit (or a meter panel) 90. The display unit 90 is disposed adjacent to the operator seat 6 visually from the operator. The display unit 90 is electrically connected to the controller 71. The display unit 90 may be provided with the switch 85. The controller 71 includes a command unit 91.

When operation of the bucket 24 is ended, the controller 71 stores the position of the bucket 24 on either the dump side E3 or the crowd side E4, and defines the stored position of the bucket 24 as an initial position for restart of the operation of the bucket 24. When the bucket cylinder C5 is telescoped from the initial position, i.e., when the piston rod 37 is moved from the initial position in either the first direction D1 or the second direction D2, the controller 71 determines whether the bucket 24 is on the dump side E3 or the crowd side E4 with respect to the neutral position 80. For example, the controller 71 makes the storage unit 86 store the position of the bucket 24 at the time immediate before a key switch is turned off. After the key switch is turned on again, the controller 71 views the position of the bucket 24 stored in the storage unit 86 so as to determine whether the bucket 24 is on the dump side E3 or the crowd side E4 with respect to the neutral position 80. It is greatly convenient because the operator does not have to perform the position confirmation operation after the key switch is turned on.

When the difference between the value of the angle sensor 81 before the key switch is turned off and that after the key switch is turned on is so great as to equal or exceed a hysteresis level, it is not sure that the bucket 24 exists at the same position as that before the key switch is turned off. In such a case, the controller 71 informs the operator of the uncertainness in position of the bucket, i.e., commands the display unit 90 to display a message for urging the operator to perform the position confirmation operation to determine whether the bucket 24 is on the dump side E3 or the crowd side E4. Specifically, the command unit 91 commands the display unit 90 to display a message for urging the operator to move the bucket 24 to the dump side E3 or the crowd side E4. Accordingly, the display unit 90 displays the message for urging the operator to locate the bucket 24 at any position on either the dump side E3 or the crowd side E4 and to register the position defined as the initial position. Therefore, the operator is only required to perform the position confirmation operation.

Figure 21:
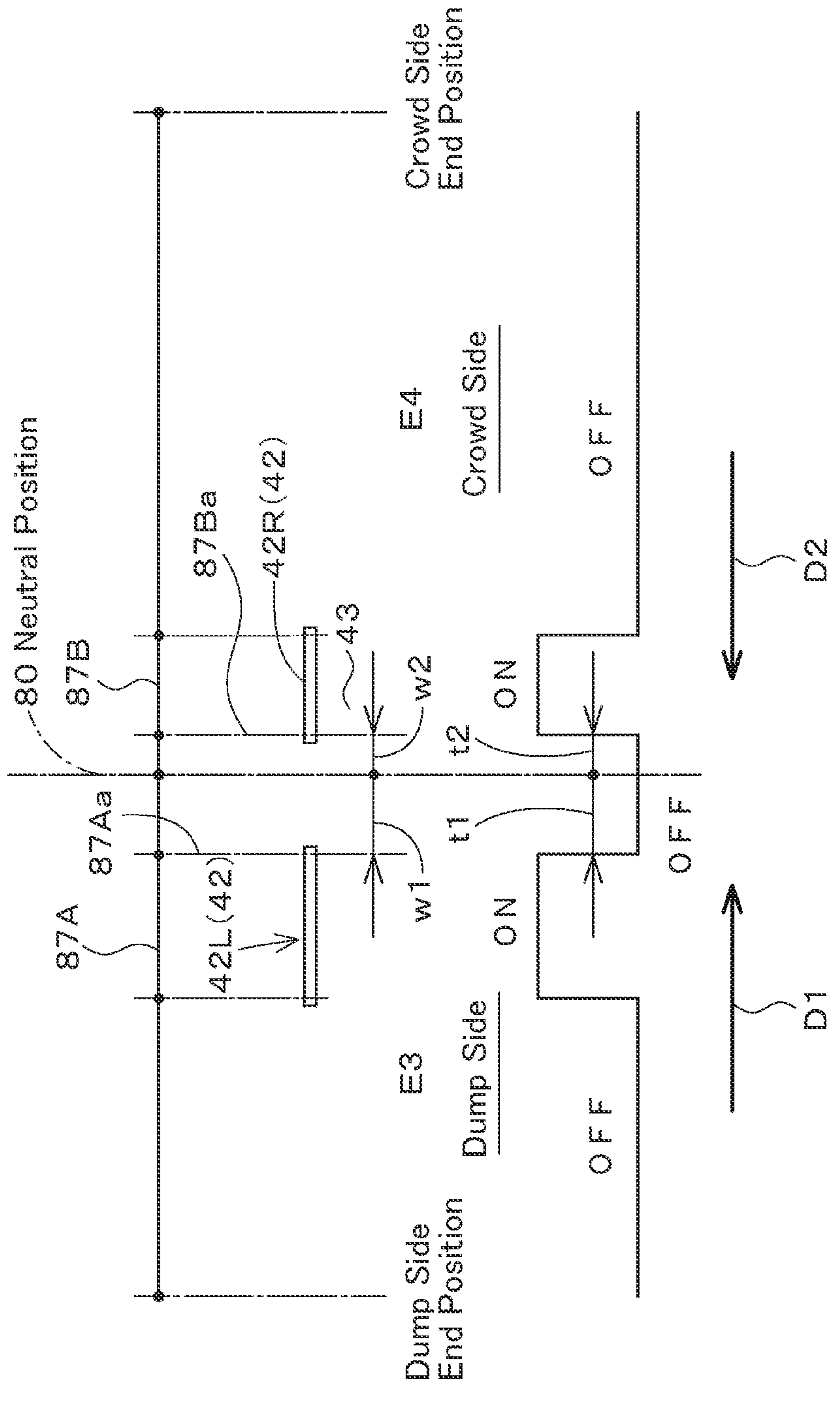
FIG. 21 is a diagram describing detection patterns according to an alternative embodiment.

FIG. 21 illustrates a first modification of the embodiment shown in FIGS. 15 to 20.

In the first modification shown in FIG. 21, two detected objects 42, i.e., detected objects 42L and 42R, are offset from each other in the longitudinal direction of the bucket cylinder C5 so as to have a space therebetween where the neutral position 80 is set. The detected object 42L is disposed to be detectable when the bucket 24 is on the dump side E3. The detected object 42R is disposed to be detectable when the bucket 24 is on the crowd side E4. In other words, the neutral position 80 defines a border between two detectable ranges, i.e., a first detectable range 87A and a second detectable range 87B. An interval (or a distance) W1 between the first detectable range 87A and the neutral position 80 is different from an interval (or a distance) W2 between the second detectable range 87B and the neutral position 80. The angle sensor 81 outputs a detection value (i.e., an angle sensor value) corresponding to the swing angle of the bucket cylinder C5. Therefore, based on the detection value of the angle sensor 81 at the time of the ON/OFF shift of the detection device 41, the controller 71 determines whether the bucket 24 is on the dump side E3 or the crowd side E4 with respect to the neutral position 80.

In the configuration shown in FIG. 21, the detected objects 42L and 42R are illustrated to have the interval therebetween, however, the configuration is not limited to the illustrated configuration. The only requirement is that the detection value of the angle sensor 81 when the bucket 24 is at a position corresponding to one ON/OFF shift point in detection by means of the detection device 41 is different from that when the bucket 24 is at another position corresponding to the other ON/OFF shift point in detection by means of the detection device 41.

The above-mentioned determination may be performed by using times t1 and t2. The first detectable range 87A has a detectable range end 87Aa closer to the neutral position 80 than the other end thereof, and the time t1 is defined as a time taken for movement of the detector 43 through the first detectable range 87A from the detectable range end 87Aa to the neutral position 80. The second detectable range 87B has a detectable range end 87Ba closer to the neutral position 80 than the other end thereof, and the time t2 is defined as a time taken for movement of the detector 43 through the second detectable range 87B from the detectable range end 87Ba to the neutral position 80. The times t1 and t2 are calculated based on the distances W1 and W2 from the neutral position 80 and the swing speed of the bucket 24, and are inputted to the controller 71.

In this case, for example, it is assumed that the detection device 41 is turned on when the detector 43 detects the detected object 42L. On this assumption, the first detection pattern appearing in detection by means of the detection device 41 when the piston rod 37 is moved in the first direction D1 is indicated as "OFF-to-ON-to-OFF" with the time t1. Based on this detection pattern, the bucket 24 can be determined as moving from the dump side E3 to the crowd side E4 and then being on the crowd side E4.

The second detection pattern appearing in detection by means of the detection device 41 when the piston rod 37 is moved in the second direction D2 is indicated as "OFF-to-ON-to-OFF" with the time t2. Based on this detection pattern, the bucket 24 can be determined as moving from the crowd side E4 to the dump side E3 and then being on the dump side E3.

If the detected objects 42L and 42R have small distances from the neutral position 80, i.e., if the times t1 and t2 are short, after one of the detected objects 42L and 42R is detected and before the other of the detected objects 42L and 42R is detected, the bucket 24 may be determined as being on the same side with the last detected detected object 42L or 42R. In the first modification, the detection device 41 may be turned off when the detector 43 detects either the detected object 42L or 42R.

As mentioned above, each of the first and second detection patterns may be a combination of ON-to-OFF and OFF-to-ON signal shifts with the turn-on time and the turn-off time, while the combination as the first detection pattern and the combination as the second detection pattern are different from each other.

Figure 22:
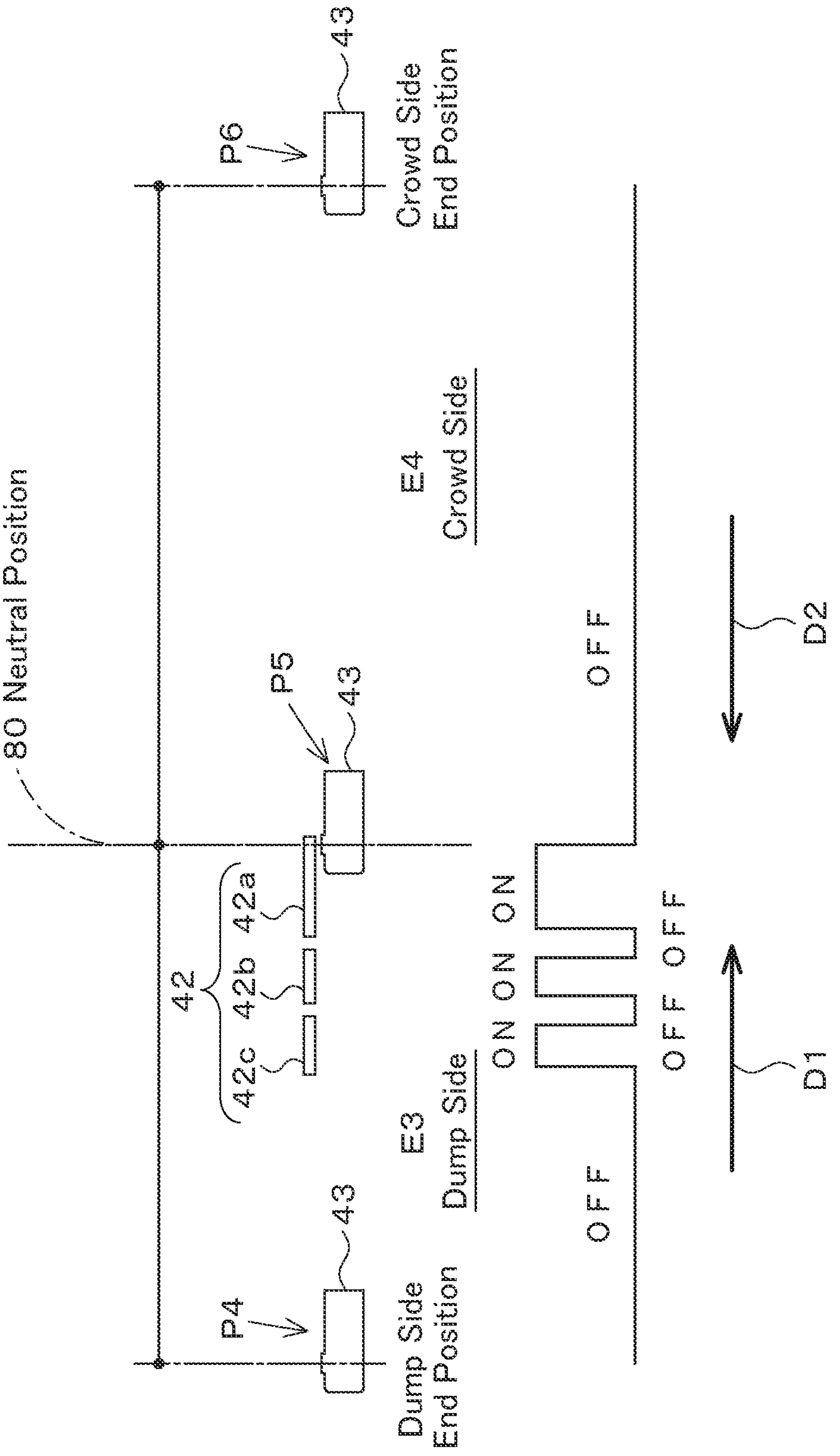
FIG. 22 is a diagram describing detection patterns according to a further alternative embodiment.
Figure 23:
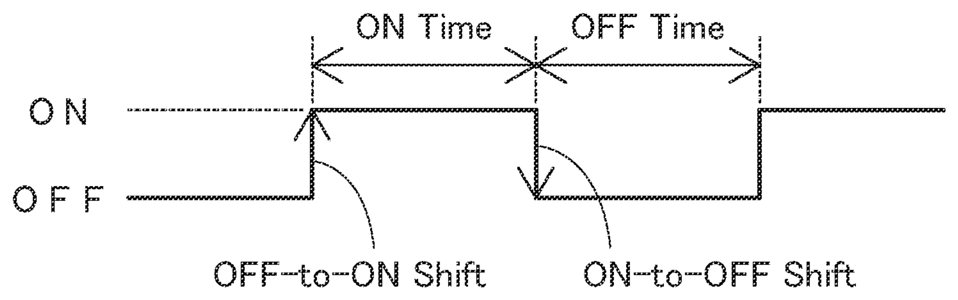
FIG. 23 is a diagram describing combinations as respective detection patterns.

FIG. 22 illustrates a second modification different from the first modification of FIG. 21.

In the second modification shown in FIG. 22, the detected object 42 includes a plurality of divisional members 42*a* to 42*c* which are offset from one another in the longitudinal direction of the bucket cylinder C5 so as to have intervals thereamong.

In the second modification shown in FIG. 22, the first detection pattern appearing in detection of ON and OFF signals by means of the detection device 41, when the piston rod 37 is moved in the first direction D1 from the dump side E3 to the crowd side E4, is indicated as "OFF-to-ON-to-OFF-to-ON-to-OFF to-ON-to-OFF." Based on this detection pattern, the bucket 24 can be determined as moving from the dump side E3 to the crowd side E4 and then being on the crowd side E4.

The second detection pattern appearing in detection of ON and OFF signals by means of the detection device 41, when the piston rod 37 is moved in the second direction D2, is indicated as "OFF-to-ON." Based on this detection pattern, the bucket 24 can be determined as moving from the crowd side E4 to the dump side E3 and then being on the dump side E3.

Constitution elements of the first and second modifications except for those mentioned above are identical or similar to those of the embodiment shown in FIGS. 15 to 20.

As mentioned above, as an alternative embodiment, each of the first and second detection patterns may be a combination of the ON-to-OFF signal shift and the OFF-to-ON signal shift, while the combination as the first detection pattern and the combination as the second detection pattern are different from each other.

Alternatively, each of the first and second detection patterns may be a combination of ones selected from a group consisting of the ON-to-OFF signal shift, the OFF-to-ON signal shift, the turn-on time and the turn-off time, while the combination as the first detection pattern and the combination as the second detection pattern are different from each other. In this regard, referring to FIG. 23, the only requirement is that a combination of an ON-to-OFF shifts count B1, an OFF-to-ON shifts count B2, a time B3 and a time B4 during movement of the piston rod 37 in the first direction D1 is different from a combination of an ON-to-OFF shifts count F1, an OFF-to-ON shifts count F2, a time F3 and a time F4 during movement of the piston rod 37 in the second direction D2.

An example of the combinations is as follows:

First direction D1: B1 is 2; B2 is 2; B3 is 2 seconds, and B4 is 2 seconds.

Second direction D2: F1 is 1; F2 is 1; F3 is 2 seconds, and F4 is 4 seconds.

Another embodiment in which the bucket 24 is determined whether it is on the dump side E3 or the crowd side E4 and then the swing position of the bucket 24 is calculated will now be described.

As mentioned above, the bucket cylinder C5 is hydraulically controlled by the bucket control valve 72 which is operated by an electric signal outputted from the controller 71. Therefore, it can be grasped by means of the controller 71 whether the bucket 24 is moved to the dump side E3 or the crowd side E4.

It is assumed that the voltage of the potentiometer serving as the angle sensor 81 becomes low when the bucket 24 is in the vicinity of the end of its swing range end, and the voltage becomes high when the bucket 24 is in the vicinity of the neutral position 80. On this assumption, if the voltage of the angle sensor 81 varies in the increasing direction during the swing of the bucket 24 in the dump direction Y1 by means of the first solenoid 72*d* excited by the controller 71, the bucket 24 is determined as being on the crowd side E4 with respect to the neutral position 80. If the voltage of the angle sensor 81 varies in the reducing direction during the swing of the bucket 24 in the dump direction Y1, the bucket 24 is determined as being on the dump side E3 with respect to the neutral position 80. If the voltage of the angle sensor 81 varies in the increasing direction during the swing of the bucket 24 in the crowd direction Y2 by means of the second solenoid 72*e* excited by the controller 71, the bucket 24 is determined as being on the dump side E3 with respect to the neutral position 80. If the voltage of the angle sensor 81 varies in the reducing direction during the swing of the bucket 24 in the crowd direction Y2, the bucket 24 is determined as being on the crowd side E4 with respect to the neutral position 80.

As mentioned above, based on the voltage of the angle sensor 81 and the electric signal for operating the bucket control valve 72, it can be determined whether the bucket 24 is on the dump side E3 or the crowd side E4.

As a modification, the operation member 75 for operating the bucket 24 may be used. The controller 71 obtains an electric signal from the operation member 75. Therefore, when the lever 76 is operated in one direction to swing the bucket 24 in the dump direction Y1, if the voltage of the angle sensor 81 varies in the increasing direction, the bucket 24 is determined as being on the crowd side E4 with respect to the neutral position 80, and if the voltage of the angle sensor 81 varies in the reducing direction, the bucket 24 is determined as being on the dump side E3. When the lever 76 is operated in another direction to swing the bucket 24 in the crowd direction Y2, if the voltage of the angle sensor 81 varies in the increasing direction, the bucket 24 is determined as being on the dump side E3 with respect to the neutral position 80, and if the voltage of the angle sensor 81 varies in the reducing direction, the bucket 24 is determined as being on the crowd side E4 with respect to the neutral position 80.

In this way, based on the voltage of the angle sensor 81 and the electric signal which the controller 71 obtains from the operation member 75, it can be determined whether the bucket 24 is on the dump side E3 or the crowd side E4.

These manners can be used without the detection device 41, thereby reducing costs.

The working machine 1 according to the embodiments has the following effects:

The working machine 1 comprises the support member (or the arm 23), the supported member (or the working tool 24) pivotally supported by the first end portion of the support member (or the arm 23) via the pivot, and the cylinder (or the working tool cylinder C5) of which telescopic movement causes the supported member (or the working tool 24) to swing around the pivot (or the working tool shaft 29). The cylinder (or the working tool cylinder C5) includes the cylinder tube 36, and the piston rod 37 inserted into the cylinder tube 36. The cylinder (or the working tool cylinder C5) is constituted by the hydraulic cylinder telescopically moved by extension and contraction movement of the piston rod 37 with respect to the cylinder tube 36 by hydraulic fluid flowing through the fluid passage formed in the piston rod 37. The cylinder tube 36 is pivotally supported by one of the first and second end portions of the support member (or the arm 23), and the piston rod 37 is pivotally supported by the other of the first and second end portions of the support member (or the arm 23). The detection device 41 for detecting the telescopic movement state of the cylinder (or the working tool cylinder C5) is provided between the cylinder (or the working tool cylinder C5) and the support member (or the arm 23).

Due to the above configuration, the cylinder (or the working tool cylinder C5) is constituted by the hydraulic cylinder telescopically moved by hydraulic fluid flowing through the fluid passage formed in the piston rod 37 so that the cylinder (or the working tool cylinder C5) and the support member (or the arm 23) have a space therebetween without a pipe or a hose. The detection device 41 disposed in the space is advantageously prevented from being damaged in comparison with the detection device 41 when provided on a portion pivotally supporting the supported member (or the working tool 24). The space is effectively usable so that the detection device 41 disposed in the space is prevented or reduced from spoiling the appearance of the working machine, and from increasing the size thereof.

The working machine 1 may comprise the machine body 2 and the boom 22 swingably attached to the machine body 2. The support member may be the arm 23 pivotally supported at the basal end portion thereof by the boom 22. The supported member may be the working tool 24 pivotally supported by the tip end portion of the arm 22 via the pivot (or the working tool shaft 29). The cylinder may be the working tool cylinder C5 for swinging the working tool 24 around the pivot.

Due to the above configuration in which the working tool cylinder C5 is constituted by the hydraulic cylinder telescopically moved by hydraulic fluid flowing through the fluid passage in the piston rod 37, the working tool cylinder C5 and the arm 23 have a space therebetween without a pipe or a hose. Therefore, the detection device 41 disposed in the space is prevented or reduced from being damaged.

The detection device 41 includes the detected object 42 provided on one of the cylinder tube 36 and the piston rod 37, and the detector 43 provided on the other of the cylinder tube 36 and the piston rod 37. The detector 43 detects the detected object 42 for detection of the telescopic movement state of the cylinder.

Due to the above configuration, the detection device 41 can be compactly disposed between the working tool cylinder C5 and the arm 23.

The detected object 42 is attached onto the outer surface of the cylinder tube 36 facing the arm 23. The detected object 42 has the predetermined length in the longitudinal direction of the cylinder tube 36, and includes the magnets 47A and 47B. The detector 43 is constituted by the proximity sensor, which is attached to the piston rod 37 between the cylinder tube 36 and the arm 23 so as to be able to face the detected object 42, and which is configured to move together with the piston rod 37 to detect the magnet 47A or 47B.

Due to the above configuration, the detection device 41 can be configured simply and economically.

The working machine 1 comprises the detector mount 52 to which the detector 43 is attached, and the connection mechanism 53 connecting the detector mount 52 to the piston rod 37. The piston rod 37 includes the first connection piece 59 joined to the piston rod 37, the second connection piece 60 joined to the detection attachment member 52, and the connection pin 61 passed through the first connection piece 59 and the second connection piece 60 so as to connect the first connection piece 59 and the second connection piece 60 to each other. The pin hole (or the first pin hole 64) is formed in the connection piece 59 to allow the connection pin 61 to pass therethrough. The pin hole is formed into the long hole shape to allow axial rotation of the piston rod 37.

Due to the above configuration, the simple connection mechanism 53 prevents the piston rod 37 from being damaged because of the axial rotation of the piston rod 37.

The working machine 1 comprises the arm 23, the bucket (or the working tool) 24 pivotally and swingably supported by the tip end portion of the arm 23, the bucket cylinder (or the working tool cylinder) C5 pivotally supported by the arm 23 via the cylinder shaft 35, the telescopic movement of the bucket cylinder C5 causing the bucket 24 to swing, the angle sensor 81 which detects the swing angle G1 of the bucket cylinder C5 when the bucket 24 is disposed on the dump side E3 with respect to the neutral position 80 where the swing angle G of the bucket cylinder C5 around the cylinder shaft 35 becomes maximum, and which detects the swing angle G2 of the bucket cylinder C5 when the bucket 24 is disposed on the crowd side E4 with respect to the neutral position 80, the detection device 41 which detects ON and OFF signals indicating whether the bucket cylinder C5 is extended further from the neutral position 80 or is contracted further from the neutral position 80, and the controller 71 for determining the swing position of the bucket 24 based on the swing angle G detected by means of the angle sensor 81 and the result of detection by means of the detection device 41. The controller 71 determines whether the bucket 24 is on the dump side E3 or the crowd side E4 in accordance with the first detection pattern appearing in detection of the ON and OFF signals by means of the detection device 41 when the bucket 24 is moved in the first direction D1 from the dump side E3 to the crowd side E4, and the second detection pattern appearing in detection of the ON and OFF signals by means of the detection device 41 when the bucket 24 is moved in the second direction D2 from the crowd side E4 to the dump side E3.

Due to the above configuration, the swing position of the working tool 24 can be accurately calculated based on the swing angle of the bucket cylinder C5 detected by means of the angle sensor 81 and the result of detection by means of the detection device 41.

Based on the first detection pattern and the second detection pattern, the controller 71 determines whether the bucket 24, when in the predetermined range as the vicinity of the neutral position 80, is on the dump side E3 or the crowd side E4.

Due to the above configuration, the position of the bucket 24 in the predetermined range as the vicinity of the neutral position 80 where the variation direction of the swing angle G is reversed can be determined while the angle sensor 81 alone is insufficient to determine the position.

While the bucket 24 is disposed out of the predetermined range, the controller 71 keeps the result of the determination regarding the position of the bucket 24 when in the predetermined range.

Due to this configuration, the detection device 41 can be configured to detect the bucket 24 in only the predetermined range as the vicinity of the neutral position 80.

The bucket cylinder 24 includes the cylinder tube 36, and the piston rod 37 extended and contracted with respect to the cylinder tube 36. The detection device 41 includes the detected object 42 provided on one of the cylinder tube 36 and the piston rod 37, and the detector 43 provided on the other of the cylinder tube 36 and the piston rod 37. The detector 43 outputs the on or off signal in response to whether the detected object 42 is detected or not.

Due to the above configuration, the position of the piston rod 37 with respect to the cylinder tube 36 facilitates the determination of the position of the bucket 24.

Either the range ranging from the neutral position 80 to the intermediate position between the neutral position 80 and the end position on the dump side E3 or the range ranging from the neutral position 80 to the intermediate position between the neutral position 80 and the end position on the crowd side E4 is defined as the detectable range 87 where the detected object 42 is detectable by means of the detector 43.

Due to the above configuration, the length of the detected object 42 can be reduced, thereby minimizing the detection device 41.

Each of the first detection pattern and the second detection pattern is a combination of ON-to-OFF and OFF-to-ON signal shifts. The combination as the first detection pattern and the combination as the second detection pattern are different from each other.

Due to the above configuration, the detection device has many variations.

When operation of the bucket 24 is ended, the controller 71 stores the result of determination of whether the bucket 24 is on the dump side E3 or the crowd side E4. The controller 71 defines the position of the bucket 24 stored on the ending of operation of the bucket 24 as the initial position for restarting of operation of the working tool, and performs the determination when the bucket cylinder C5 is extended or contracted from the initial position.

Due to the above configuration, the position of the bucket 24 does not have to be confirmed every restarting of operation of the bucket 24 after ending of the last operation of the bucket 24, thereby enhancing the convenience in operation of the bucket 24.

The working machine comprises the display unit 90 connected to the controller 71. The display unit 90 displays the message for urging an operator to operate to locate the bucket 24 on either the dump side E3 or the crowd side E4.

Due to the above configuration, the operator can be informed of a position change of the working tool 24, for example.

The controller 71 performs the determination based on the detection value outputted from the angle sensor 81 when the ON/OFF signal shift occurs in detection by means of the detection device 41.

Due to this configuration, whether the bucket 24 is on the dump side E3 or the crowd side E4 can be determined based on the detection value from the angle sensor 81 when the ON/OFF signal shift occurs in detection by means of the detection device 41.

When operation of the bucket 24 is ended, the controller 71 stores information indicating whether the bucket 24 is on the dump side E3 or the crowd side E4. When operation of the bucket 24 is restarted, the controller 71 determines the swing position of the bucket 24 based on the information stored on the last ending of operation of the bucket 24.

Due to this configuration, the position of the bucket 24 does not have to be confirmed every restarting of operation of the bucket 24 after ending of the last operation of the bucket 24, thereby enhancing the convenience in operation of the bucket 24.

The working machine comprises the instruction input unit (or the switch 85) for receiving the instruction input from an operator, the instruction input indicating whether the bucket 24 is on the dump side E3 or the crowd side E4.

Due to this configuration, the operator can inform the controller 71 regarding whether the bucket 24 is on the dump side E3 or the crowd side E4.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:

a machine body;

a boom swingably attached to the machine body;

a support member pivotally supported at a basal end portion thereof by the boom;

a supported member supported by a tip end portion of the support member via a pivot, the tip end portion being an opposite side of the basal end portion; and a cylinder of which telescopic movement causes the supported member to swing around the pivot, the cylinder including a cylinder tube, and a piston rod inserted into the cylinder tube, and a linkage including a first link and a second link, the first link being pivotally supported at a first end thereof by the tip end portion of the support member, the second link being pivotally supported at a first end thereof by the supported member and pivotally connected at a second end thereof to a second end of the first link, wherein the cylinder includes a rod head provided at a tip end portion of the piston rod and having ports via which hydraulic fluid is supplied or discharged, is constituted by a hydraulic cylinder telescopically moved by extension and contraction movement of the piston rod with respect to the cylinder tube by hydraulic fluid supplied to or discharged from fluid passages formed in the piston rod via the ports, is positioned such that a length of the cylinder extends along the support member and the cylinder is opposed to the support member, and includes an attachment portion provided at a bottom side end portion of the cylinder tube, the bottom side end portion being a side opposite to a side at which the extension movement of the piston rod is performed, the attachment portion being pivotally supported by the second end of the first link and the second end of the second link, and has the rod head at the tip end portion of the piston rod pivotally supported by the basal end portion of the support member, and at a position closer to the basal end portion of the support member than the first link, a detection device for detecting a telescopic movement state of the cylinder is provided to intervene between a surface of the cylinder facing the support member and a surface of the support member facing the cylinder, the detection device includes a detected object and a detector, the detector detecting the detected object, thereby detecting the telescopic movement state, one of the detected object and the detector is attached to an outer surface of the cylinder tube facing the support member, and the other of the detected object and the detector is disposed between the cylinder tube and the support member so as to be able to face the one of the detected object and the detector, and is attached to an attachment structure joined to the rod head.

2. The working machine according to claim 1, wherein the support member is an arm pivotally supported at the basal end portion thereof by the boom, wherein the supported member is a working tool pivotally supported by a tip end portion of the arm via the pivot, and wherein the cylinder is a working tool cylinder for swinging the working tool around the pivot.

3. The working machine according to claim 1, wherein the detection device includes the detected object provided on the cylinder tube, and the detector attached to the attachment structure.

4. The working machine according to claim 3, wherein the detected object is attached onto the outer surface of the cylinder tube facing the support member, wherein the detected object has a predetermined length in a longitudinal direction of the cylinder tube, and includes a magnet, and wherein the detector is constituted by a proximity sensor, which is attached to the piston rod between the cylinder tube and the support member so as to be able to face the detected object, and which is configured to move together with the piston rod to detect the magnet.

5. The working machine according to claim 3, wherein the attachment structure includes a detector mount to which the detector is attached; and a connection mechanism connecting the detector mount to the piston rod, wherein the connection mechanism includes a first connection piece joined to the rod head, a second connection piece joined to the detector mount, and a connection pin passed through the first connection piece and the second connection piece so as to connect the first connection piece and the second connection piece to each other, and wherein a pin hole is formed in the first connection piece to allow the connection pin to pass therethrough, the pin hole allowing axial rotation of the piston rod.

6. The working machine according to claim 1, further comprising:

an arm serving as the support member;

a working tool serving as the supported member pivotally supported by a tip end portion of the arm;

a working tool cylinder serving as the cylinder pivotally supported by the arm via a cylinder shaft, a telescopic movement of the working tool cylinder causing the working tool to swing;

an angle sensor which detects a swing angle of the working tool cylinder when the working tool is disposed on a dump side with respect to a neutral position where a swing angle of the working tool cylinder around the cylinder shaft becomes maximum, and which detects a swing angle of the working tool cylinder when the working tool is disposed on a crowd side with respect to the neutral position; and a controller for determining a swing position of the working tool based on the swing angle detected by means of the angle sensor and a result of detection by means of the detection device, wherein the detection device detects ON and OFF signals indicating whether the working tool cylinder is extended further from the neutral position or is contracted further from the neutral position, and wherein the controller determines whether the working tool is on the dump side or the crowd side in accordance with a first detection pattern appearing in detection of the ON and OFF signals by means of the detection device when the working tool is moved in a first direction from the dump side to the crowd side, and a second detection pattern appearing in detection of the ON and OFF signals by means of the detection device when the working tool is moved in a second direction from the crowd side to the dump side.

7. A working machine comprising:

a machine body;

a boom swingably attached to the machine body, an arm pivotally supported at a basal end portion thereof by the boom;

a working tool supported by a tip end portion of the arm via a pivot, the tip end portion being an opposite side of the basal end portion;

a linkage including a first link and a second link, the first link being pivotally supported at a first end thereof by the tip end portion of the arm, the second link being pivotally supported at a first end thereof by the working tool and pivotally connected at a second end thereof to a second end of the first link;

a working tool cylinder including a cylinder tube and a piston rod extended and contracted with respect to the cylinder tube, the working tool cylinder having a first end in a longitudinal direction pivotally supported by the second end of the first link and the second end of the second link, and having a second end in the longitudinal direction pivotally supported by the basal end portion of the arm via a cylinder shaft, being configured to have a swing angle that, when the working tool cylinder is being extended from a fully contracted state to a fully extended state, gradually increases and becomes maximum in a halfway point, and then gradually reduces and the working tool cylinder reaches the fully extended state, the swing angle being defined as an angle of the working tool cylinder swinging around the cylinder shaft, wherein a telescopic movement of the working tool cylinder in the longitudinal direction causing the working tool to swing in a crowd direction, which is a direction approaching the arm, and to swing around the pivot in a dump direction, which is a direction opposite to the crowd direction;

an angle sensor which detects the swing angle of the working tool cylinder around the cylinder shaft, the angle sensor detecting the swing angle of the working tool cylinder when the working tool is disposed on a dump side with respect to a neutral position, and detecting the swing angle of the working tool cylinder when the working tool is disposed on a crowd side with respect to the neutral position, the neutral position being a swing position of the working tool in a state where the swing angle of the working tool cylinder is at the maximum;

a detection device including:

a detected object provided on one of the cylinder tube and the piston rod; and a detector provided on the other of the cylinder tube and the piston rod wherein the detector detects the detected object, the detection device detecting, in response to whether the detected object is detected by the detector or not, ON and OFF signals indicating whether the working tool cylinder is extended past the state where the swing angle is at the maximum or is contracted further from the state where the swing angle is at the maximum; and a controller for determining a swing position of the working tool based on the swing angle detected by means of the angle sensor and a result of detection by means of the detection device, wherein the controller determines whether the working tool is on the dump side or the crowd side in accordance with a first detection pattern appearing in detection of the ON and OFF signals by means of the detection device when the working tool is moved in a first direction from the dump side to the crowd side, and a second detection pattern appearing in detection of the ON and OFF signals by means of the detection device when the working tool is moved in a second direction from the crowd side to the dump side, and based on a result of the determination whether the working tool is on the dump side or the crowd side and the swing angle of the working tool cylinder detected by the angle sensor, a location of the working tool in a swing range, which is a range where the working tool swings around the pivot.

8. The working machine according to claim 7, wherein, based on the first detection pattern and the second detection pattern, the controller determines, when the working tool is within a predetermined range in the vicinity of the neutral position, whether the working tool is on the dump side or the crowd side with respect to the neutral position.

9. The working machine according to claim 8, wherein when the working tool is out of the predetermined range, the controller keeps a result of the determination performed within the predetermined range.

10. The working machine according to claim 7, wherein either a range ranging from the neutral position to an intermediate position between the neutral position and an end position on the dump side or a range ranging from the neutral position to an intermediate position between the neutral position and an end position on the crowd side is defined as a detectable range where the detected object is detectable by means of the detector.

11. The working machine according to claim 7, wherein each of the first detection pattern and the second detection pattern is a combination of ON-to-OFF and OFF-to-ON signal shifts, and wherein the combination as the first detection pattern and the combination as the second detection pattern are different from each other.

12. The working machine according to claim 7, wherein when operation of the working tool is ended, the controller stores the result of determination of whether the working tool is on the dump side or the crowd side, and wherein the controller defines the position of the working tool stored on the ending of operation of the working tool as an initial position for restarting of operation of the working tool, and performs the determination when the working tool cylinder is extended or contracted from the initial position.

13. The working machine according to claim 7, further comprising:

a display unit connected to the controller, wherein the display unit displays a message for urging an operator to operate to locate the working tool on either the dump side or the crowd side.

14. The working machine according to claim 7, wherein the controller performs the determination based on a detection value outputted from the angle sensor when an ON/OFF signal shift occurs in detection by means of the detection device.

15. The working machine according to claim 7, wherein when operation of the working tool is ended, the controller stores information indicating whether the working tool is on the dump side or the crowd side, and wherein when operation of the working tool is restarted, the controller determines the swing position of the working tool based on the information stored on the last ending of operation of the working tool.

16. The working machine according to claim 7, further comprising:

an instruction input unit for receiving an instruction input from an operator, the instruction input indicating whether the working tool is on the dump side or the crowd side.

* * * * *